(12) United States Patent
Roscoe

(10) Patent No.: US 10,958,426 B2
(45) Date of Patent: Mar. 23, 2021

(54) IMPROVING SECURITY PROTOCOLS

(71) Applicant: OXFORD UNIVERSITY INNOVATION LIMITED, Oxford (GB)

(72) Inventor: Andrew William Roscoe, Oxford (GB)

(73) Assignee: OXFORD UNIVERSITY INNOVATION LIMITED

( * ) Notice: Subject to any disclaimer, the term of this patent is extended or adjusted under 35 U.S.C. 154(b) by 257 days.

(21) Appl. No.: 16/070,758

(22) PCT Filed: Jan. 18, 2017

(86) PCT No.: PCT/GB2017/050111
§ 371 (c)(1),
(2) Date: Jul. 17, 2018

(87) PCT Pub. No.: WO2017/125729
PCT Pub. Date: Jul. 27, 2017

(65) Prior Publication Data
US 2019/0044711 A1 Feb. 7, 2019

(30) Foreign Application Priority Data

Jan. 18, 2016 (GB) .................................. 1600922.7

(51) Int. Cl.
*H04L 29/06* (2006.01)
*H04L 9/08* (2006.01)
(Continued)

(52) U.S. Cl.
CPC .......... *H04L 9/0844* (2013.01); *H04L 9/0643* (2013.01); *H04L 9/321* (2013.01);
(Continued)

(58) Field of Classification Search
CPC ..... H04L 9/0844; H04L 9/0643; H04L 9/321; H04L 9/3213; H04L 9/3215; H04L 63/108

See application file for complete search history.

(56) References Cited

U.S. PATENT DOCUMENTS

| 5,666,420 A | 9/1997 | Micali |
| 2007/0086593 A1 | 4/2007 | Denning et al. |

(Continued)

FOREIGN PATENT DOCUMENTS

| WO | WO/01/80479 | 10/2001 |
| WO | WO/2017/125729 | 7/2017 |

OTHER PUBLICATIONS

Roscoe, A.W., "Human-centred computer security." 2005. http://web.comlab.ox.ac.uk/oucl/work/bill.roscoe/publications/113.pdf. (Year: 2005).*

(Continued)

*Primary Examiner* — Sarah Su
(74) *Attorney, Agent, or Firm* — Polsinelli PC

(57) ABSTRACT

A computer implemented method of authenticating communication between a first node and a second node, using a function of combined information obtained from at least one of the nodes, the method comprising: sending a commitment message from the first node to the second node, the message containing content based on (at least) a first part of the combined information, which content commits the first node to a first value of the function, and wherein the first part of the combined information is communicated from the first node to the second node with a delay mechanism that only allows the first part of the information to be determined by the second node after a predetermined time; and in response to receiving notification at the first node that the second node (Continued)

has received the message, which receipt commits the second node to the first function value.

28 Claims, 8 Drawing Sheets

(51) Int. Cl.
  *H04L 9/32*   (2006.01)
  *H04L 9/06*   (2006.01)
(52) U.S. Cl.
  CPC .......... *H04L 9/3213* (2013.01); *H04L 9/3215* (2013.01); *H04L 63/108* (2013.01)

(56) References Cited

U.S. PATENT DOCUMENTS

| | | | | |
|---|---|---|---|---|
| 2008/0240440 A1* | 10/2008 | Rose | ...................... | G06F 21/40 380/277 |
| 2009/0119754 A1* | 5/2009 | Schubert | ........... | H04W 12/0602 726/4 |
| 2009/0313475 A1* | 12/2009 | Roscoe | ................. | H04L 63/065 713/181 |
| 2010/0115277 A1* | 5/2010 | Roscoe | ................. | H04L 9/0844 713/170 |
| 2011/0231652 A1* | 9/2011 | Bollay | .................. | H04L 63/306 713/153 |
| 2015/0326398 A1* | 11/2015 | Modarresi | ................. | H04L 9/32 713/181 |
| 2016/0173496 A1* | 6/2016 | Saka | ..................... | H04W 12/08 726/4 |
| 2016/0226883 A1* | 8/2016 | Kusens | ................... | H04W 4/80 |

OTHER PUBLICATIONS

Search Report from UK Intellectual Property Office for corresponding GB Application No. GB1600922.7 dated Aug. 25, 2016.
Long Hoang Nguyen et al, "Authentication protocols based on low-bandwidth unspoofable channels: a comparative survey", International Association for Cryptologic Research vol. 20100419:174340, Apr. 14, 2010, pp. 1-53.
Ben-or M et al: "A fair protocol for signing contracts", IEEE Transactions on Information Theory, IEEE Press, USA, vol. 36, No. 1, Jan. 1, 1990 (Jan. 1, 1990), pp. 40-46.
International Search Report and Written Opinion for corresponding PCT Application No. PCT/GB2017/050111 dated Jul. 27, 2017.

* cited by examiner

IMPROVING SECURITY PROTOCOLS

CROSS-REFERENCE TO RELATED APPLICATIONS

This application is U.S. National Stage Entry of PCT Application No. PCT/GB2017/050111, filed Jan. 18, 2017, which claims priority to GB Application no. 1600922.7 filed Jan. 18, 2016, the contents of each are entirely incorporated by reference herein.

FIELD OF THE INVENTION

This invention relates to improving security protocols. In particular, but not exclusively, it relates to detecting failed attacks on human-interactive security protocols (HISPs).

BACKGROUND Summary

One of the main challenges in pervasive computing is how to establish secure communication over an untrusted high-bandwidth network without any initial knowledge or a Public Key Infrastructure (PKI). Authentication between two devices can allow the devices to communicate securely with one another. These can involve human users communicating with each other through those devices, or might involve pairing of devices to send technical/status information back and forth.

An approach studied by a number of researchers is building security though involving humans in a low-bandwidth "empirical" out-of-band channel where the transmitted information is authentic and cannot be faked or modified. Protocols may achieve the optimal amount of authentication for a given amount of human work. However it might still be attractive to attack them if a failed attack might be misdiagnosed as a communication failure and therefore remain undetected. It would be beneficial if such misdiagnosis were made more difficult.

Human interactive security protocols (HISPs) achieve authentication by having one or more human users form part of a non-spoofable out-of-band (oob) channel between the devices that are involved. They can do this without involving PKIs, shared secrets or trusted third parties (TTPs). Humans' involvement limits the amount of data transferred on the oob channel, and therefore what is provided is generally a compromise between the certainty of the authentication supplied by the protocol and ease of use. Whilst a security guarantee can be achieved with a protocol that an attacker can do no better than as a man-in-the-middle who divides the group into two disjoint parts and runs the protocol separately with each, purporting to be the nodes missing for each (see FIG. 1), the compromise means practical implementations frequently have a small, but not totally negligible, probability of such a man-in-the-middle attack succeeding (probability 1/D where D is the number of short strings in the set from which the values compared via the humans are drawn). For example if the humans have to compare six decimal digits, this probability cannot be below $10^{-6}$. Protocols can be designed that essentially achieve this bound by preventing an attacker from performing a combinatorial search to improve its chances.

Known approaches to creating protocols work (in the sense of avoiding combinatorial attack) by the protocol participants becoming committed to one or more pieces of data (such as a nonce, Diffie-Hellman token $g^x$ or hash key) before knowing that data.

Whilst the above described protocols may only give an attacker (called, for example: 'Eve') a single guess against each protocol run between two parties (called, for example: 'Alice' and 'Bob'), Eve might get a further attempt if Alice and Bob try again after seeing that they have a failed run (and could continue to attack other parties). (Alice and Bob may well be more likely to try again if they believe the failure was due to a communication glitch, or a mistake on their part, rather than an abortive attack). If the devices they are using (or some other computer system) can indicate to Alice and Bob that the strings they had to compare were different, then both Alice and Bob, and the system which implements the protocol, should know that an attack has occurred. However if the attacker can abort before Alice and Bob's devices have been sent this information, it may be impossible for the devices to distinguish between different possibilities and therefore impossible to provide any indication of an attack.

It is known to provide such HISPs where either recipient devices need to authenticate the origins of messages, or where one or more people want to set up a secure network between a number of devices, but where there is no usable PKI or other pre-installed network of secrets to prove identities. Instead, it is assumed that a high bandwidth network with no security guarantees at all is supplemented by out of band channels implemented by the human(s) using the devices. The assumption is made that these channels are authentic, in the sense that the humans know that they are correctly either transferring data between devices or correctly comparing pieces of data appearing on separate ones. It is not assumed, however, that the out-of-band communications are private.

It is assumed that, in common with protocols that prevent an attacker from performing combinational searches, a protocol succeeds (and authentication is assumed) if short strings generated on all the devices are equal in addition to all other messages conforming to the pattern expected of them. The humans either check this equality themselves or transmit the strings between devices so that the devices can check it for them.

Protocols that meet this requirement are characterised by their use of techniques that prevent the man-in-the-middle from choosing his constants more intelligently than by this random approach. For simplicity, the situation involving the pairing of two entities, Alice and Bob, is discussed, but this discussion applies equally to situations like FIG. 1, at least for protocols capable of handling groups, and Alice and Bob will be communicating via hardware devices (referred to as nodes). An aim of these protocols is to authenticate: typically one party to the other(s), or all other parties to a single one, or all parties to each other. Most of them take advantage of this authentication to agree a key between the parties. The intruder's aim is to have them believe they have completed the protocol with each other when in fact they have different values for the "agreed" data. The attacker will succeed in this just when he gets Alice's and Bob's short strings to agree though they have not run the protocol properly with each other. For example if the attacker has some information about the short string that Alice will use before Bob is committed to his value for it, the attacker can potentially search for values of constants that the attacker sends to Bob (pretending to be Alice) that improve the attacker's chance of success. If the attacker already knows the value of the string Alice will use, he can look for values to feed to Bob that will generate the same value.

Examples of HISPs

The following are a few examples of protocols. The message-sending notation here is used: $A \rightarrow_X B:M$ means that M is sent by A to B over the medium X Two mediums are used: N is a high-bandwidth network with no security assumptions, typified by the internet. If A sends the message there is no guarantee that B gets it; if B apparently gets this message there is no guarantee that it comes from A (it might have been constructed by the attacker Eve); and even if the message gets through successfully it might have been overheard by Eve. In other words N is a Dolev-Yao channel. E is the out-of-band, or empirical channel which is low bandwidth and implemented by human(s). It has the guarantee that if B thinks he has received M from A over E, then A really has sent this message to him.

Commitment schemes are known in cryptography to allow a party to commit to a chosen piece of data and to hide it from other parties until a later stage, when the data can then be revealed. Commitment schemes are designed so that a party cannot change a value or statement after some step of a process, even though they have not yet revealed that value or statement. Consequently, once that step has been undertaken, they are said to be committed to that value/statement. Such known commitment schemes can be used as part of a HISP so that a node can be committed to the value that will be eventually compared using humans, before that node releases its contribution to the calculation of that value. Commitment schemes are often implemented via the use of cryptographic hash functions, as in the following protocol between A and B, which is adapted from the usual group version:

Symmetrised HCBK Protocol (SHCBK):

| 1a. | $A \rightarrow_N B$ | : | $A, INFO_A, hash(A; K_A)$ |
| 1b. | $B \rightarrow_N A$ | : | $B, INFO_B, hash(B; k_B)$ |
| 2a. | $A \rightarrow_N B$ | : | $k_A$ |
| 2b. | $B \rightarrow_N A$ | : | $k_B$ |
| 3. | $A \leftrightarrow_E B$ | : | $digest(k_A \oplus k_B; INFOS)$ |

Here, $\oplus$ is bitwise XOR and $INFOS=(INFO_A; INFO_B)$ is the information A and B are authenticating to each other. $k_A$ and $k_B$ are cryptographic length, e.g. 256, strings of random bits and hash is a standard cryptographic hash function. digest(k;M) is a function that chooses a b-bit short string representing a short "hash" of M with respect to k. It must ideally satisfy:

Definition: A b-bit digest function: $digest: K \times M \rightarrow Y$ where K, M and $Y=\{0 \ldots (2^b-1)\}$ are the set of all keys, input messages and digest outputs, and moreover:

for every $m \in M$ and $y \in Y$, $Pr_{\{k \in K\}} [digest(k,m)=digest(k \oplus \theta, m')] \leq 2^{-b}$ for every m, $m' \in M$ ($m \neq m$) and $\theta \in K$: $Pr_{\{k \in K\}} [digest(k, m)=digest(k \oplus \theta, m')] \leq 2^{-b}$ In practice the final $2^{-b}$ is often replaced by some E slightly greater than $2^{-b}$, and the $\theta$ is only required in some protocols, not including the pairwise version above. Digest functions are closely related to universal hash functions. This protocol works because each of A and B is completely committed to the value of its final digest before it releases its contribution to the digest key.

They therefore each know that the attacker Eve had no knowledge whatsoever of the digest key in time to have sent them material that could have been the result of a search for a value that will give a particular digest result. The specification of the digest function then implies that such search is pointless and the best Eve can do is to interpose herself between Alice and Bob and trust to luck that the independently chosen digests in the two resulting runs are equal.

The two keys $k_A$ and $k_B$ can be characterised as independent randomisers of the short string, thanks to the properties of $\oplus$ and the specification of a digest. Choosing either value randomly, and independently of however the other is chosen, maps the short string to a random value in its domain. In this protocol each party chooses a randomiser r and ensures that it itself is committed to the value of the short string before it tells anyone the value of r. An important part of the implementation of the above protocol, and all the following ones, is that where a node has been committed to the value of a randomiser r before knowing that value, as and when the node does learn what it thinks is that value of r, it checks the said value against the earlier commitment. In the above case this is done by hashing the data received in Message 2a or 2b to ensure it corresponds to, and is thus consistent with, what was received in Message 1a or 1b respectively.

This pairwise version of the protocol can be simplified slightly: because in this pairwise protocol B does not send Message 1b before receiving Message 1a, he is therefore committed to the value of his own digest at the point he sends Message 1b and in fact can send $k_B$ rather than hash(B; $k_B$) at this stage, with Message 2b not then being necessary. However this is more remote from the group version of SHCBK.

SHCBK is termed a direct binding protocol because the agreed short string is a type of hash of the information Alice and Bob are trying to authenticate. This is analogous to the traditional use of signed cryptographic hashes in authenticating data: here the signature is replaced by the communication of the digest over the authentic oob channel, and the digest can be much shorter than a hash because of the care taken to avoid combinatorial attacks. The following protocol, on the other hand, is termed indirect binding because the short string is chosen independently of the message and bound to it during the protocol. This particular protocol only transmits an authenticated message one way. Here, $R_A$ and $R_B$ are b-bit short strings chosen at random by the two agents.

Vaudenay Pairwise One-Way Authentication Protocol:

| [A] $c \| d := commit(INFO_A;R_A)$; |
| 1: $A \rightarrow_N B : INFO_A$, c |
| 2: $B \rightarrow_N A : R_B$ |
| 3: $A \rightarrow_N B : d$ |
| [B] Ra := open($INFO_A$, c, d) |
| 4: $A \rightarrow_E B : R_A \oplus R_B$ |

B verifies the correctness of $R_A \oplus R_B$

Here, commit(M;R) is a pair c||d (following known notation) where knowledge of c commits the recipient to the values of M and R, though the said recipient may not yet know M and must not (even with the knowledge of M) be able to deduce the short string R. d reveals R and confirms (and if necessary reveals) M. Thus c is not a function of M and R, since if it were, a search through the relatively few possible values of R would reveal the real one. Rather it is in a one-to-many relationship with M and R, as possibly implemented by:

c=hash(M,R,X) where X is a random nonce: a string of say 256 random bits.

d=(R,X)

The presence of X makes it impractical to work out R from c: it is termed a cloak for R. Note that even though $INFO_A$ and $R_A$ are, given this implementation, transmitted openly in messages 1 and 3, there is still an important computation to be done in the line where B computes $R_A$=open($INFO_A$, c, d): Bob has to verify that the $INFO_A$, d and c he has received, apparently from Alice, are consistent. The purpose of $R_B$ here is to make sure that if Alice sends Message 3 in response to a Message 2 faked by Eve before Bob has received Message 1, the chances of Eve's $R_B$ equalling the real one are $2^{-b}$. This normally prevents the final comparison being a success for Eve. Note that $R_A$ and $R_B$ are independent randomisers for the short string, that B only sends $R_B$ when it is committed to the final value of the short string (as well as $INFO_A$) and that A only reveals $R_A$ when it is also committed to the final value of $R_A \oplus R_B$. Thus, though the appearance of this protocol is rather different from pairwise SHCBK, the modus operandi using a committed-before-reveal randomiser, and a pair of independent randomisers, is actually rather similar. The two protocols above can be used to send or agree authenticated cryptographic material between Alice and Bob, but not in a way that is directly secret. Therefore an approach to building privacy for Alice and Bob is to make the authenticated material contain either an asymmetric "public" key or Diffie-Hellman style tokens such as $g^{x\_A}$ and $g^{x\_B}$. Another example is a direct binding protocol that uses cryptographic material in the authentication exchange: $g^{x\_Ax\_B}$ becomes an authenticated session key between A and B. It is an interesting example chiefly because it is widely implemented. The core of this protocol is:

ZRTP Protocol:

| | | |
|---|---|---|
| 1: | $A \rightarrow_N B$ : | hash($g^{x\_A}$) |
| 2: | $B \rightarrow_N A$ : | $g^{x\_B}$ |
| 3: | $A \rightarrow_N B$ : | $g^{x\_A}$ |
| 4: | $A \leftrightarrow_N B$ : | shorthash($g^{x\_A}$, $g^{x\_B}$) |

(The shorthash can equally be of any value randomised by x_A and x_B, such as the shared key $g^{x\_Ax\_B}$.) This works in a way very similar to the shortened pairwise version of SHCBK mentioned above. The only difference is that the randomisation present in the authentication re-uses the Diffie-Hellman exchange that establishes the key. This is efficient, but the properties of modular exponentiation and the b-bit shorthash need to be carefully managed and studied to provably achieve the same security bounds attained by the first two protocols. In other words, $X_A$ and $X_B$ are both used as randomisers for this protocol, and while intuitively this should work well it is not mathematically obvious. In each of these protocols, it is the scheme of commitment to the randomisers that avoids combinatorial attacks based on searching, and they use a method of commitment before knowledge. Better protocols will also be immune to conventional attacks possible without such searching. HISPs will preferably have cryptographically important values and operations used in them, other than short values for human comparison, that are strong enough to have a very high probability of withstanding an imaginable brute-force attack.

Although these protocols prevent the attacker from searching against the short string on a single run of the protocol, they do not prevent repeated attempts to have a correct guess against multiple independent runs, whether the users try over and over again to bootstrap security in a single group of devices, or attempts are made against a variety of groups as they form until one succeeds. An attack might be executed in the following way (restricting, for simplicity, to the pairing of Alice and Bob):

1. When a run between Alice and Bob begins, initiated by Alice, the intruder Eve will play the part of Bob in that run and herself initiate a run with Bob, pretending to be Alice. These two runs will progress through a number of stages of interaction leading to the final comparison of short strings (which unbeknownst to them are the strings generated by the two separate runs) by Alice and Bob. Because it is assumed that the protocol is optimal in the sense discussed above, Eve just introduces a random value when she has to contribute something like a key or nonce to either of her versions of the protocol. Of course the attack only succeeds if the separate short stings $s_A$ and $s_B$ in the two runs happen to coincide.

2. At some point in the run between Alice and Eve (qua Bob), each of the two participants will have the data to allow them to compute their short string $s_A$. One of them will necessarily have this information before the other, inevitably the one to send the last message before they both know it. The same thing happens in the run between Eve (qua Alice) and Bob.

3. In organising her attack, Eve is free to interleave the messages she sends/receives to Alice and Bob so that their own order of sends and receipts exactly follows what would have happened if they had really been running the protocol with each other. If she does this, Eve is bound to have first knowledge of the digest in one of the two runs and second knowledge in the other. Furthermore Eve will know both $s_A$ and $s_B$ before one of Alice and Bob knows his or her own short string. In some protocols (particularly the more symmetric group protocols) it may be possible for Eve to choose a schedule so that she knows both of these values before any of the honest participants do. In pairing protocols she will be playing the two roles in the two runs: one of these will be the one that gets knowledge of s first.

4. It follows that Eve will know whether her attack will succeed or fail before both of the devices that are being used by Alice and Bob have the information that will allow them to know. If she is going to succeed, she will naturally press on and break into what Alice and Bob will both regard as a successfully completed session. However if she is going to fail, the logical move for her will be not to send the messages remaining to Alice and/or Bob that will reveal the short string to them.

5. In that last case, Alice and Bob's devices will never both have their short strings, and so will not be in a position to compare them (or output them to Alice and Bob to compare them). They will therefore lack evidence that an attack was taking place and may very well conclude that the failure of the protocol to complete is down to a communications glitch.

6. It is likely that any protocol implementation that chose to diagnose that an attack was taking place because some message was not received would give rise to a lot of false positives.

It would be advantageous if it could be shown that some parties had progressed a long way in interacting with Alice and Bob and then aborted runs. In order to mitigate for at least some of the aforementioned problems, there is provided a computer implemented method of authenticating communication between a first node and a second node, using a function of combined information obtained from at least one of the nodes, the method comprising: sending a commitment message from the first node to the second node, the message containing content based on (at least) a first part of the combined information, which content commits the first node to a first value of the function, and wherein the first part of the combined information is communicated from the first node to the second node with a delay mechanism that only allows the first part of the information to be determined by the second node after a predetermined time; and in response to receiving notification at the first node that the second node has received the message, which receipt commits the second node to the first function value: sending a subsequent message comprising the first part of the information from the first node to the second node, or waiting until after the predetermined time; and in response to the second node receiving the subsequent message before the predetermined time, or in response to waiting until after the predetermined time: compiling the combined information at the second node by combining the first part of the information, obtained from the subsequent message or determined after the predetermined time using the delay mechanism, with the remainder of the combined information at least part of which has been received from the first node, calculating the function of the combined information at each of the first node and the second node, thereby to enable comparison of the calculated function values of each node using an empirical channel.

There is also provided: a computer implemented method of authenticating communication between a first node and a second node using a commitment scheme having a commit phase and a reveal phase, the method comprising: committing the first node to a value during the commit phase; revealing information that enables the value to be determined, during the reveal phase at the second node, thereby to enable comparison of the value at the first node and the data at the second node using an empirical channel, characterised in that data enabling the second node to determine the value, is sent to the second node with a delay mechanism that only allows the second node to determine the value after a predetermined time.

Further aspects of the invention will be apparent from the description and the appended claims.

BRIEF DESCRIPTION OF THE DRAWINGS

A preferred embodiment of the description will now be described, by way of example only, with reference to the following figures, in which.

DETAILED DESCRIPTION EMBODIMENTS OF THE INVENTION

The concept of auditing any failed run of a protocol is described below. This means a protocol run which has terminated without delivering the intended authentication to Alice and Bob, either because some message has not been received by one of Alice and Bob within some time limit, or because one of the internal checks of the protocol has failed, or because the comparison over the oob channel has failed. Auditing such a run may mean running a procedure which can help to determine whether the failure was related to an attack or was a consequence of communications failure.

As described above, an intruder can attack communication between two parties by positioning itself in between the parties in a way that it can intercept communications before passing on the messages in their original, or in an altered state. This is illustrated at FIG. 1.

Figure 1:
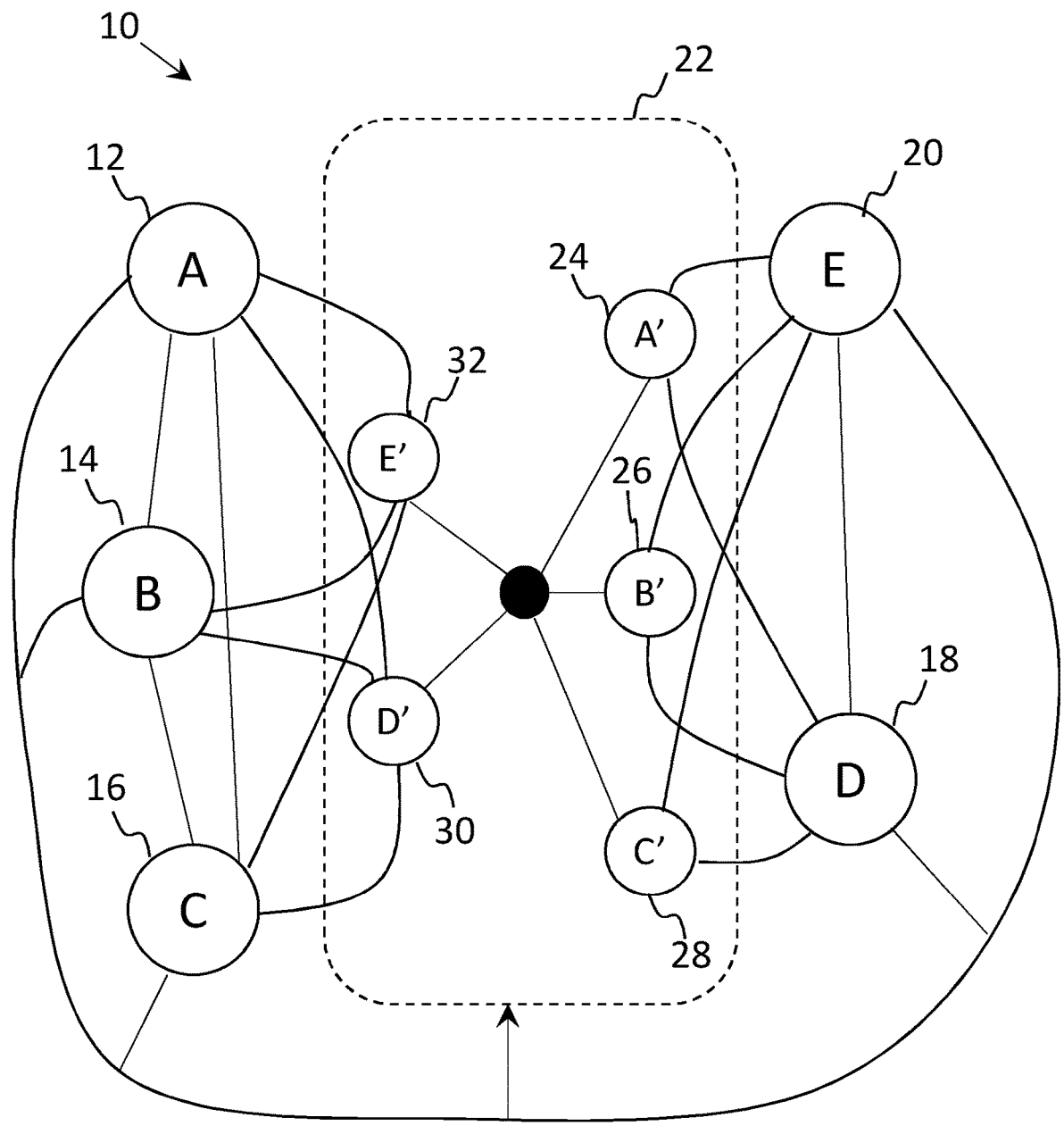
FIG. 1 is a schematic showing how an intruder might infiltrate communication between nodes.

FIG. 1 shows five nodes A 12, B 14, C 16, D 18 and E 20 in a network 10. Each of the five nodes A 12, B 14, C 16, D 18 and E 20 is able to communicate with each of the other nodes A 12, B 14, C 16, D 18 and E 20. In order to instigate an attack on the network, an intruder 22 can position themselves such that the network 10 is effectively split into two groups. For example, the intruder can effectively replicate nodes A 12, B 14, C 16, D 18 and E 20 with five further nodes A' 24, B' 26, C' 28, D' 30 and E' 32. Therefore the attacked network 10 effectively comprises 10 nodes in two groups of five, in which the attacker 22 is able to intercept communications from one of the nodes A 12, B 14, C 16, D 18 and E 20 before sending a communication to the intended recipient. For example, the network 10 is split such that nodes A 12, B 14 and C 16 are effectively separated from nodes E 20 and D 18 by the intruder 22. In the event that one of nodes A 12, B 14, C 16 wants to run a protocol with node D 18 or E 20, attacker 22 interposes and effectively runs the protocol separately with each of the groups, the first group being nodes A 12, B 14, C 16, D' 30 and E' 32 and the second group being A'24, B' 26, C' 28, D 18 and E 20. In this way, when node A believes that it is communicating with node E, it may actually be communicating with node E' 32, which is communicating with node E 20 via node A' 24.

Whilst the example of FIG. 1 shows 5 nodes of a network 10 and a further 5 nodes provided by an attacker 22, the network may comprise any number of nodes, but the principal of a man-in-the-middle, performed by attacker 22, remains the same.

Figure 2:
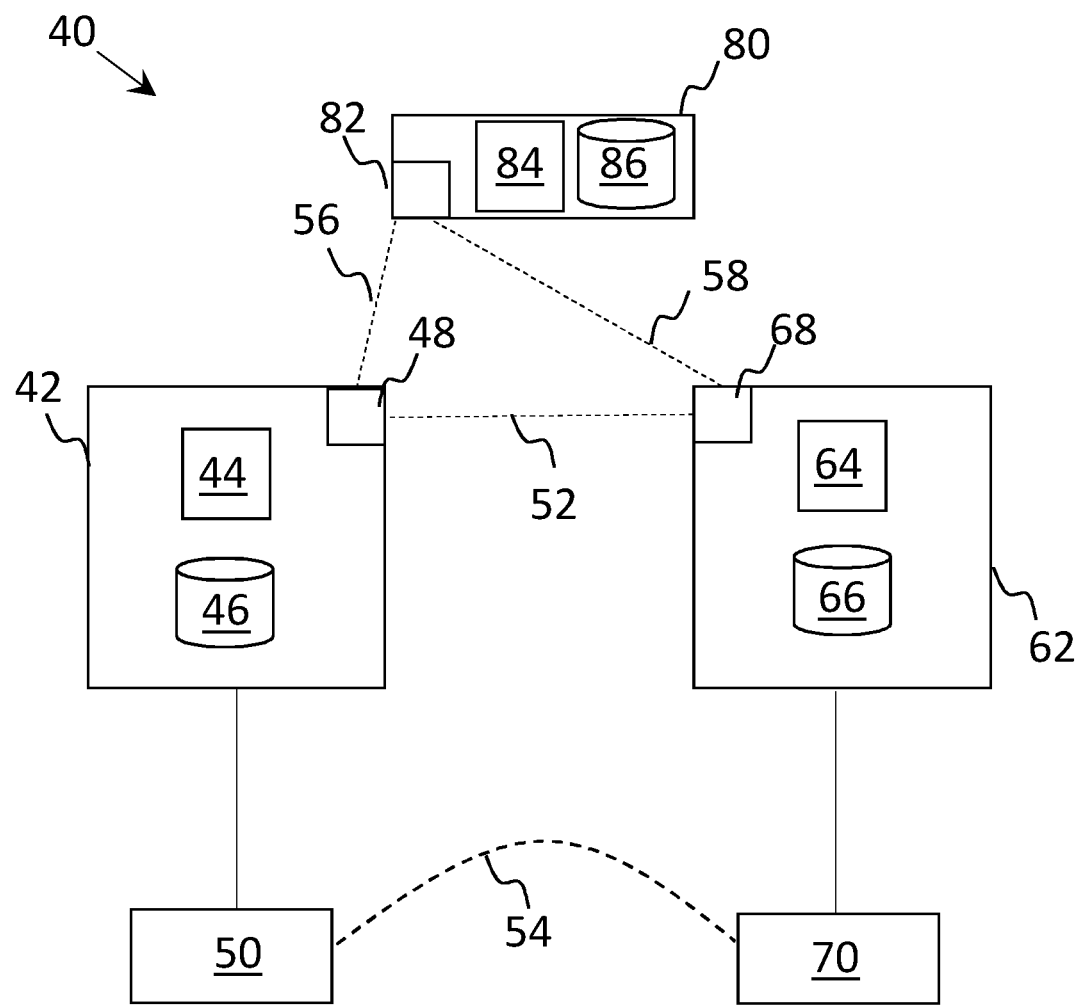
FIG. 2 is a schematic showing communication between two nodes.

FIG. 2 is a system 40 of nodes that are configured to interact with one another in accordance with embodiments of the invention described below. There is shown a first node 42 and a second node 62. The first node 42 comprises a processor 44, a memory 46, a communication interface 48 and an output 50. The second node 62 also comprises a processor 64, a memory 66, a communication interface 68 and an output 70. The first node 42 and the second node 62 are configured to communicate between the communications interfaces 48, 68 over communication pathway 52. Outputs 50, 70 of the first node 42 and the second node 62 are used to compare information from the first node 42 and the second node 62 over an empirical/oob channel 54 (such as by humans).

The system 40 also shows a trusted third party server 80 (which may be a part of the system or external to it). The trusted third party server comprises a communication interface 82, a processor 84 and a memory 86. The trusted third party server communicates with the first node 42 over communications pathway 56 and with the second node 62 over communications pathway 58. Although only one trusted third party server 80 is shown, in further examples there might be more trusted third party servers 80, or none.

The schematic 40 illustrates components of a system that can be used to implement protocols according to the invention. There may also be further nodes present.

Figure 3:
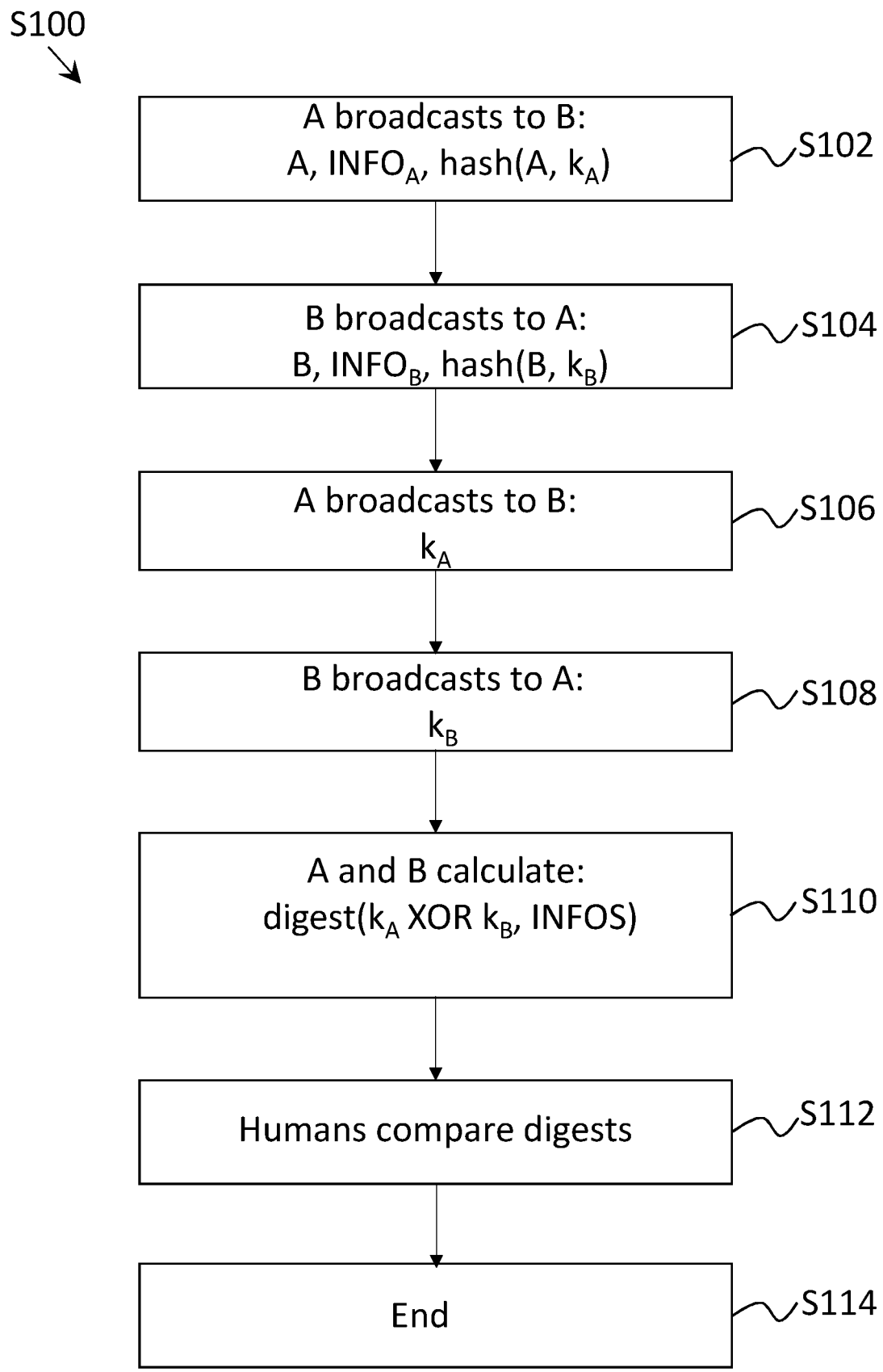
FIG. 3 is a flow chart of a known protocol for authenticating two nodes.

FIG. 3 is a flow chart S100 that illustrates the Symmetrised HCBK protocol described above, which can be implemented between the first node 42 and the second node 62, described in reference to FIG. 2 above.

At step S102 node A, which can be the first node 42, broadcasts a message to node B, which can be the second node 62 described in a two node system of FIG. 2. The message comprises the information $INFO_A$ that node A wishes to authenticate with node B. The message also comprises a standard cryptographic hash function of a key, $k_A$, generated by node A. Following step S102, node A has committed to its contribution to a final value of a digest that is calculable from combined information obtained from node A and node B.

The process then moves to step S104. At step S104, node B broadcasts a message to node A. The message comprises the information $INFO_B$ that node B wishes to authenticate with node A. The message also comprises a standard cryptographic hash function of a key $k_B$ generated by node B. Following step S104, node B has committed to its contribution to a final value of a digest that is calculable from combined information obtained from node A and node B.

The process then moves to step S106. At step S106, once node A has been committed to the final value of the digest by receipt of B's message from S104, it broadcasts the key $k_A$ generated by node A, to node B.

The process then moves to step S108. At step S108, once node B has received $k_A$ as sent in step S106, it broadcasts the key, $k_B$, generated by node B, to node A.

Once node A has received the two messages from node B, and node B has received the two messages from node A, at step S110, node A and node B each calculate a digest value based on the keys $k_A$, $k_B$ and the information broadcast from each node to the other node. The calculation for such a digest may be made as described above.

The process then moves to step S112, where the digest values are displayed at an output of the nodes, for example, output 50 of the first node 42 and output 70 of the second node 62. A comparison of the digests calculated by each of node A and node B at step S110 is then compared at step S112. The comparison is thus made over an empirical channel, for example by humans.

The process then ends at step S114.

Although a protocol, such as that described at FIG. 3, and similar such protocols, prevent an attacker from searching against the short string on a single run of the protocol, they do not prevent repeated attempts to have a correct guess against multiple independent runs, whether the users try over and over again to bootstrap security in a single group of devices, or attempts are made against a variety of groups as they form until one succeeds.

As described above, if an attacker, Eve, knows whether her attack will succeed or fail before all of the devices that are being authenticated will have the information that will allow them to know. If she is going to succeed, she will naturally press on and break into what Alice and Bob will both regard as a successfully completed session. However if she is going to fail, the logical move for her will be not to send the messages remaining to Alice and/or Bob that will reveal the short string to them. In that case, Alice and Bob will never both have their short strings, and so will not be in a position to compare them. They will therefore lack conclusive evidence that an attack was taking place and may very well conclude that the failure of the protocol to complete is down to a communications glitch. It is likely that any protocol implementation that chose to diagnose that an attack was taking place because some message was not received would give rise to a lot of false positives.

If it could be shown that some parties had progressed a long way in interacting with the two of them and then aborted runs which would have had differing short strings, this would represent evidence (as described above) that the system had been subject to an attack, for example, following failure to receive authentication messages by either Alice or Bob. In the example of FIG. 2, Alice may relate to the first node 42 and Bob may relate to the second node 62. In this case, the first node 42 and the second node 62 are still connected by their out-of-band channel 52, and so can compare notes on what has happened.

It would be advantageous if, following an aborted run, a state could be achieved where each of Alice and Bob knows the following:

(1) No conceivable intruder could have known the digest their own run was heading to at the point of the abort; and
(2) Has direct evidence, through inconsistency of messages received, that an attack was attempted; and
(3i) Knows the digest value that he or she would have calculated and compared, and whether their device would have raised any further inconsistencies before the end of the protocol, Or alternatively one of Alice and Bob knows (1) and (2) above and
(3ii) Knows the digest value that he or she would have calculated and compared, and furthermore knows that if the other of Alice and Bob does not know his or her value then an attack has taken place.

With either alternative, by conferring over the oob channel 52 they can conclude one of the following trichotomy of outcomes:

(a) No intruder knew both short strings at the point of the abort, and therefore had no way of knowing at that point that any attack being carried out would succeed or not. An intruder would have no benefit from this other than denial of service.
(b) That the protocol failed even though the short strings would have agreed: this is almost certainly due to a communications failure.
(c) That Alice and Bob were heading towards different short strings, meaning that an attacker was almost certainly involved, or that some other sort of attack was taking place.

In the last eventuality (c), Alice and Bob would take countermeasures such as:
(1) Upping the security level of any subsequent connection attempt (for example by increasing the length of the short string).
(2) Notifying any servers associated with the applications running the protocol, so that they can take appropriate defensive or forensic action.
(3) Changing the communications network being used.

A protocol that achieves the above advantages is 'auditable' because when things go wrong the run can be scrutinised to determine what went wrong.

However, by introducing time-dependent data and timeouts into modified protocols, the above described deficiencies can be addressed.

This can be done by ensuring that an auditable protocol behaves like the non-auditable one within some time limit T, and it will not complete unless by time T either both nodes will eventually have their digest values by some later time T', or will by conferring on the empirical/oob channel (e.g., channel 54) be able to detect an attack. There is no need to know exactly what the times T and T' are, merely that they exist. This is described in relation to FIGS. 4 and 7, which illustrates a modification of the Symmetrised HCBK protocol.

Figure 4:
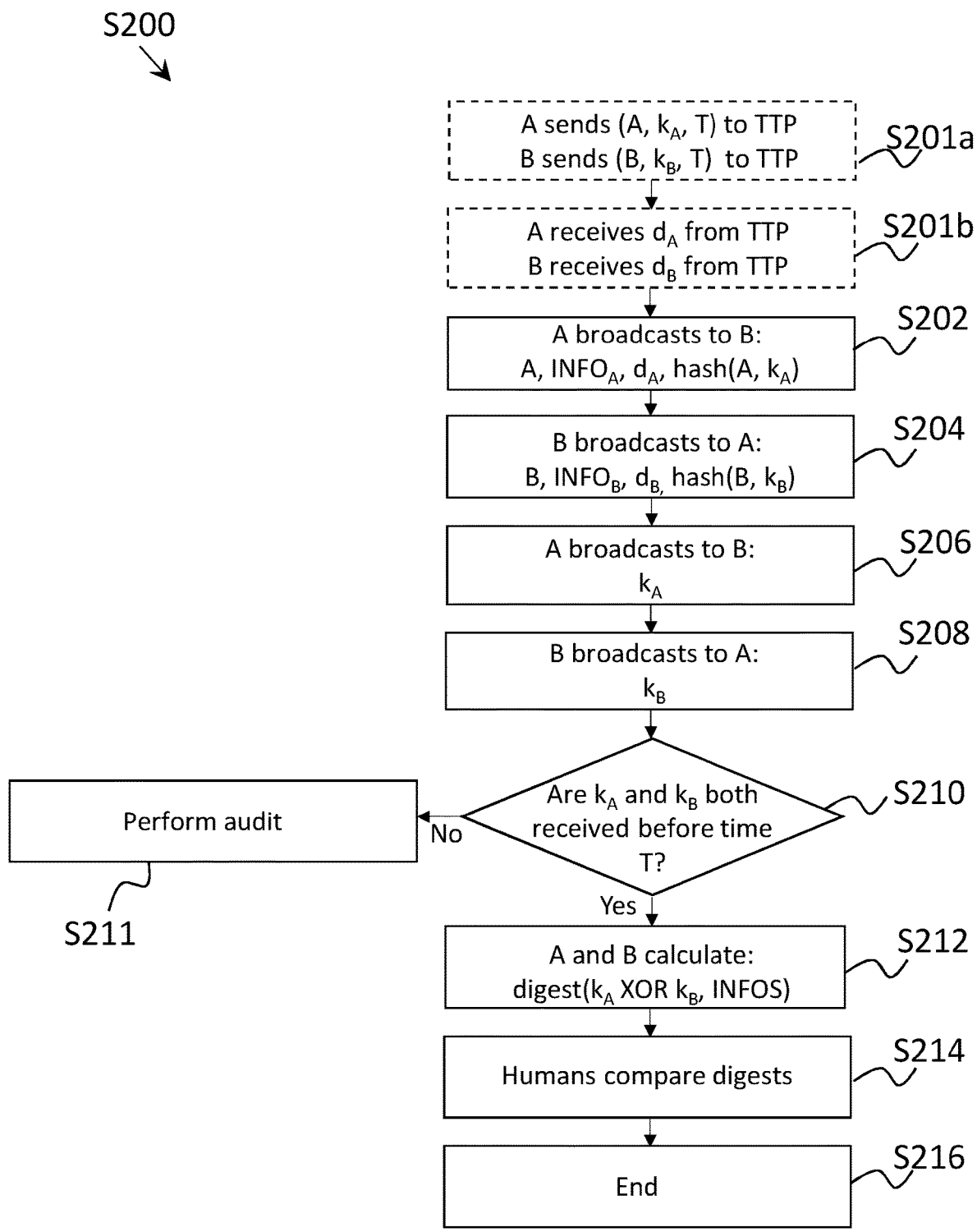
FIG. 4 is a flow chart of a protocol for authenticating two nodes according to an embodiment of the invention.

FIG. 4 illustrates a flow chart S200 of a first modified Symmetrised HCBK protocol performed between the first node 42, named node A, the trusted third party server 80 and the second node 62, named node B, in accordance with an embodiment of the invention. System 40 may be used.

As described below the process S200 uses delay mechanisms d which provide for a key k to be received/know but no before a predetermined time T. Different delay mechanisms can be used and substituted for each other. A delay mechanisms d preferably includes a cryptographic primitive delay(x, t), with the following properties:
(1) Any device who knows delay(x, t) can gain knowledge of, or calculate x, but it the delay mechanism that is configured so that it is difficult to know/calculate x (and preferably as difficult as possible) until at least t units of time since its first creation).
(2) No device (that does not already know the value of x) can deduce anything about x from it before that point.
(3) In the same agent that created delay(x, T), the boolean intime(x) returns true if before T since the call of delay(x, T), and false otherwise.
(4) In the case that the value being delayed has less than 256 bits of entropy, additional random information analogous to the use of the random nonce X in the commit scheme referred to for Vaudenay-style protocols is added to prevent searching for collisions in the values of delay(x, T).

One example of a delay mechanism has associated steps S201a and S201b which are illustrated with dotted lines in FIG. 4. In this example, in order to ensure that the second node 62 does not receive the keys k before a predetermined time, T, trusted third party server 80 is used.

In order to be able to audit the process that begins at step S202, at step S201a, node A, which can be the first node 42, broadcasts a message to a trusted third party (TTP), which can be the server 80. The message comprises the information that is to be delayed (plus additional entropy if required by (4) above) and is encrypted using a public key of the TTP server 80. In the example of FIG. 4, the information to be delayed includes the key $k_A$ generated by node A, along with time T, which is the time relative to the present time (rather than an absolute time) after which delayed content may be decrypted. Similarly, at step S201a, node B, which can be the second node 62, broadcasts an encrypted message to a trusted third party (TTP), which can also be the server 80. The message comprises the information that is to be delayed. In the example of FIG. 4, the information to be delayed includes the key $k_B$ generated by node B, along with time T, which is the time relative to the present time after which delayed content may be revealed.

In response to receiving the information at step S201a, at step S201b the server 80 generates delay mechanisms $d_A$ and $d_B$.

In the case of step S201b, $d_A$ includes delay($k_A$, T) and $d_B$ includes delay($k_B$, T) so that $d_A$ is the combination of $k_A$ and the time when by the TTP's measure the $d_A$ should open (i.e. the time the request for to create $d_A$ was received plus T), all signed and encrypted under a key known only to the TTP. If the TTP receives such a $d_A$ (or an identifier of it), after the time it contains, it can publish $k_A$.

An example of $d_A$ would be a token y combined with a hash of ($k_A$, T). Using that example the trusted third party sever 80, responds to the receipt of the messages from the first node 42 and the second node 62 at step S201a by decrypting the messages with its private key and generating tokens y and y' that are sent to the first node 42 and to the second node, along with the respective with hashes of the keys $k_A$ and $k_B$ and a predetermined time, T.

Once the first node 42 and the second node 62 have the respective delay mechanisms, the process can move to step S202. At step S202 node A, which can be the first node 42, broadcasts a message to node B, which can be the second node 62. The message comprises the information $INFO_A$ that node A wishes to authenticate with node B. The message also includes a standard cryptographic hash function of a key $k_A$ generated by node A, and includes the delay mechanism $d_A$.

As will be described below in relation to step S212 a digest will be calculated as a function of combined information which includes $k_A$. Because elements of the broadcast message in step S202 are based on $k_A$, and the remaining parts of the combined information that originate from node A were also included, following step S202, node A has committed to its contribution to a final value of a digest that is calculable from combined information obtained from node A and node B. Node A is committed to this final value even though it cannot yet know or calculate would it will be (because it does not yet have the required information from Node B). Accordingly, FIG. 4 includes an example of a commitment scheme.

After step S202 the process then moves to step S204. At step S204, node B broadcasts a message to node A. The message comprises the information $INFO_B$ that node B wishes to authenticate with node A. The message also comprises a standard cryptographic hash function of a key $k_B$ generated by node B and the delay mechanism $d_B$.

Following step S204, node B has committed to its contribution to a final value of a digest that is calculable from combined information obtained from node A and node B.

The process then moves to step S206. At step S206, once node A has received the message sent by B in S204, it broadcasts the key $k_A$ generated by node A, to node B.

The process then moves to step S208. At step S208, once node B has received key $k_A$, it broadcasts the key, $k_B$, generated by node B, to node A.

The process then moves to step S210. At step S210, each of node A and node B check whether the keys $k_A$ and $k_B$ were received from the other node before the time T specified in the delay function of the messages sent at steps S202 and S204. If $k_A$ was received at node B before time T specified in $d_A$, and $k_B$ was received at node A before time T specified in $d_B$, then the process does not time out and the process can proceed to step S212. If either $k_A$ or $k_B$ were received after times T specified in $d_A$ and $d_B$, or if they are not received at all (i.e. the communications/pairing appear to have been aborted) then the process moves to step S211, where an audit process performed. The audit process is described with reference to FIG. 5. In in order, to save on resources, the audit process may only be performed at step S211 every so often e.g. after a predetermined (or random) number of attempts.

At step S212, once node A has received the two messages from node B, and node B has received the two messages from node A, node A and node B each calculate a digest value based on the keys $k_A$, $k_B$ the information broadcast from each node to the other node. The calculation for such a digest may be made as described above in relation to FIG. 3.

The process then moves to step S214, where the digest values are displayed at an output of the nodes, for example, output 50 of the first node 42 and output 70 of the second node 62. A comparison of the digests calculated by each of node A and node B at step S212 is then made at step S214. The comparison is thus made over an empirical channel, for example by humans.

The process then ends at step S216.

At some point in the process one or each of the nodes 42 and 62 also check that when the appropriate hash function is applied to the key ($k_A$, $k_B$) it obtained at step S208 or S206 that the value corresponds to the hash value received at step S202. If these do not correspond then an attack can be indicated in a conventional manner—though because such a change to the key is so easy to detect it is less likely that an intruder will attempt this.

Different delay mechanisms might be used to ensure that the keys of the first message do not arrive at the nodes to which they are sent before time T. Some alternative methods are described in more detail below and may not require a third party sever 80 to be used or even be present.

Figure 5:
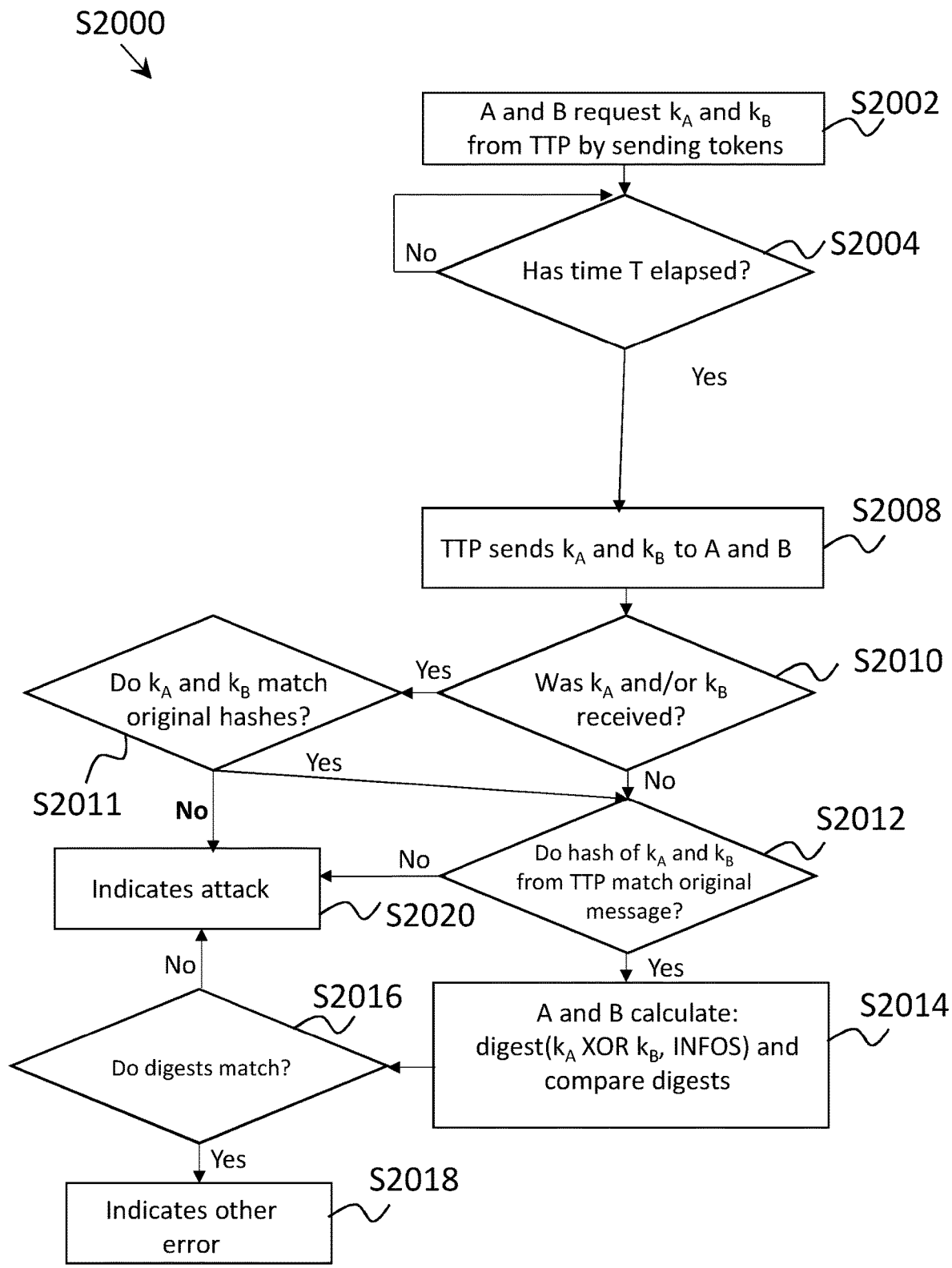
FIG. 5 is a flow chart of a process for auditing an authentication protocol.

A process S2000 of auditing a failed protocol is shown at FIG. 5. In an example (such as that described above in relation to steps S201 and S201b) where a trusted third party server 80 is used to provide the delay mechanism, the respective nodes A and B will have received the tokens y' and y each other at step S202 following their generation by the trusted third party server 80, where the tokens can be used to identifier the remainder of $d_A$ and/or $d_B$. The auditing process, as described with reference to FIG. 5 commences at step S211 of FIG. 4, when, for example, either $k_A$ or $k_B$ are not received and time T passes.

The first node 42 and the second node 62 can use the tokens to obtain the keys $k_A$ or $k_B$ from the trusted third party server 80, after the time, T, specified in the delay mechanism associated with the delays $d_A$ and $d_B$. In the event that either A and/or B does not receive a token from the TTP at step S2002, no meaningful attack has taken place because an attacker Eve cannot have both digest values to compare and therefore the audit is terminated.

After receipt of a token from one of both of A and B at step S2002, the server 80 uses the token(s) to look up the remainder of $d_A$ and/or $d_B$ including their time T. At step S2004 determines whether the predetermined relative time, T, disclosed in the delay mechanism $d_A$ and $d_B$, has elapsed since the delay mechanisms were generated. If the time T has not elapsed, the server 80 rejects any request for the keys $k_A$ and/or $k_B$ to be revealed. Once the times have elapsed, the process can move to step S2006, whereby the values $k_A$ and $k_B$ are sent to the respective nodes A and B. Rather than do this automatically a rejection at step S2004 (i.e. when a request is received too early) can send process S2000 back to before step S2002 to await a further request before proceeding.

In further examples, the tokens y and y' may in themselves contain the information that the trusted third party server 80 requires to recover the time T and/or keys $k_A$ and $k_B$ without resorting to the memory 86 (such as by use of encryption). Instead of sending the token y from the trusted third party server 80 to the first node 62 upon receipt of the message from the first node 42, the trusted third party server 80 may receive the communication from and/or send the token y to the second node 42, relaying on communication between the nodes or being given one node's address by the other node.

The process then moves to step S2010 where it is determined whether $k_A$ and/or $k_B$, were recovered from the other node A/B (at step S206/S208). If either of the keys $k_A$ and $k_B$ were not received (e.g. the process was aborted), then the process moves to step S2012. The appropriate hash functions are applied to $k_A$ and/or $k_B$, as received from the trusted third party server 80, and the resultant hashes are compared to the hashes of $k_A$ and/or $k_B$, as received at the nodes A and B in the original messages of steps S202 and S204, as shown at FIG. 4.

If it is determined that the hashes of $k_A$ and/or $k_B$, as received from the trusted third party server 80, do not match the hashes of $k_A$ and/or $k_B$, as received at the nodes A and B in the original messages of steps S202 and S204, the process moves to step S2020, whereby one or both nodes indicate that an attack was attempted. An indication at one node can be provided to the other node.

If it is determined that the hashes of $k_A$ and/or $k_B$, as received from the trusted third party server 80, do match the hashes of $k_A$ and/or $k_B$, as received at the nodes A and B in the original messages of steps S202 and S204, the process moves to step S2014, whereby the digests values are calculated at each of node A and node B using the keys received from the sever 80 at step S2008 and are then compared with one another such as over the empirical channel. The process moves to step S2016, where it is determined if the digests match. If the digests do not match, the fact that there is a mismatch (or the digests themselves) are input into one or both nodes and the process moves to step S2020. At step S2020 it may be indicated to a user by one or both nodes that a man-in-the-middle attack occurred and was abandoned because the man-in-the-middle attacker was unsuccessful in their attempt to generate values for $k_A$ and $k_B$ that would result in matching digests. If the digests do match, the process moves to step S2018, whereby it may be indicated that the error to receive the keys before time T was not due to an attack, but rather due to another failure of the system (such as a communication failure).

If the values of $k_A$ and $k_B$, were received from one of the nodes A and B (from step S206/S208), the process moves to step S2011, where an internal check of the values of $k_A$ and/or $k_B$ is received from the server 80 (S2008) and the other node (S206/S208) is made. If the $k_A$ and/or $k_B$ received from the server 80 (S2008) and the other node (S206/S208) values do match, the process reverts to step S2012, as described above.

If the of $k_A$ and/or $k_B$ is received from the server 80 (S2008) and the other node (S206/S208) values do not match, the process moves to step S2020, whereby one of both nodes indicate that an attack was made by a man-in-the-middle attacker.

Therefore, even if no value for $k_A$ or $k_B$ has been received, an audit can be performed in order to differentiate between communications failure and a failed attack.

If one is concerned about the vulnerability of individual TTPs, several TTPs can be used, and have each agent wishing to use a trusted third party server 80 select a different server at random.

The use of a TTP as detailed above would be very suitable when the nodes have to depend on the presence of a TTP for other reasons in their exchange. This would be true, for example, in models of electronic (financial) transactions.

Note that the form of time used in delay(x, t) is relative: t is a delay from the present time, rather than an absolute time at which x will open. There is an advantage in this in that it helps prevent any need to worry about how accurate the knowledge of the present time in each node might be. However the work required of the TTP above might be considerable if it was serving a lot of clients. The following alternative approach, alleviates this.

An alternative server TL can be sued that issues a series of asymmetric "time-lock" keys, each labelled with the time it was created and the time it will open, each, coupled with its opening time, signed by TL. When the appointed times for opening these keys, come round, TL issues the corresponding decryption keys. So all this TTP has to do is post a series of signed keys.

For example the server 80 might issue one key every 10 seconds, with a delay of one minute before the counterpart was issued. The key pairs might then be made available online for several days to enable auditing.

Agents can still implement delay(x, t) using this service, but only if they can bound the divergence between their own system time and that employed by TL. This knowledge will enable them to pick an already posted key that will not be opened by TL for at least t units of time, and encrypt x under it.

Figure 6A:
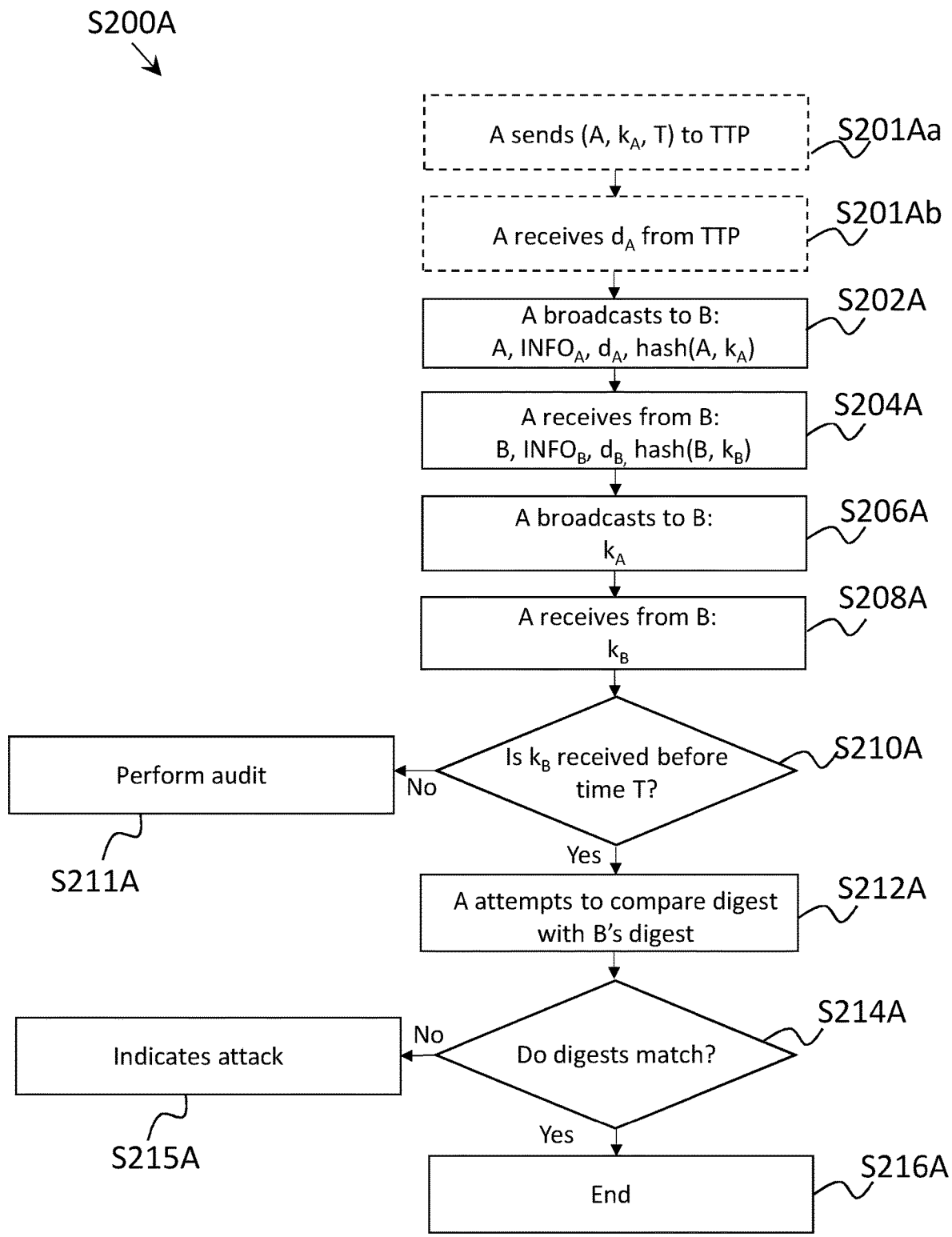
FIG. 6A is a flow chart of an implementation of the embodiment of FIG. 4 at a first device acting as a node.

The method shown at FIG. 4 may be performed at each of the first node 42 (A) and the second node 62 (B). As depicted in FIG. 2 each of the first node 42 and the second node 62 can be implemented as computer based devices and each of these devices can be programmed to perform respective steps of the process. FIG. 6A shows an implementation of the process S200A at the first node 42.

In order to be able to audit the protocol, at step S201Aa, node A, which can be the first node 42, broadcasts a message to a trusted third party (TTP), which can be the server 80. The message comprises the information that is to be delayed. In response to receiving the information at step S201Aa, at step S201Ab the server 80 generates delay mechanism $d_A$, which is a cryptographic primitive delay(x, t), with the properties described above in respect of FIG. 4.

In the case of step S201Ab, $d_A$ is delay($k_A$, T) and may also include an identifying token y. Once the first node 42 has the delay mechanism, the process can move to step S202A. At step S202 node A broadcasts a message to node B, which can be the second node 62. The message comprises the information $INFO_A$ that node A wishes to authenticate with node B. The message also comprises a standard cryptographic hash function of a key $k_A$ generated by node A and the delay mechanism $d_A$.

Following step S202A, node A has committed to its contribution to a final value of a digest that is calculable from combined information obtained from node A and node B.

The process then moves to step S204A. At step S204A, the first node 42, node A, confirms that B has received the function: hash(A, $k_A$). Confirmation of receipt may be obtained by the use of a sequence of events, for example, the sequence shown with respect to FIG. 4, whereby the first node 42 only broadcasts $k_A$ to the second node 62 once it has received corresponding information (e.g. the contents of step S204 of FIG. 4(B, $INFO_B$, $d_B$, hash(B, $k_B$))).

The process then moves to step S206A. At step S206A, once node A has received confirmation that node B has received its message, it broadcasts the key $k_A$ that it has generated, to node B.

The process then moves to step S208A. At step S208A, node A receives the key $k_B$ from node B. The process then moves to step S210A. At step S210A, node A checks whether the key $k_B$ was received from the node B within the time T specified in the delay function of the messages sent at steps S202A. If $k_B$ was received before time T then the process does not time out and the process can proceed to step S212A. If either $k_B$ was received after time T specified in $d_B$, or if it is not received at all (i.e. the communications/pairing appear to have been aborted) then the process moves to step S211A, where an audit process performed. The audit process is described with reference to FIG. 5. Alternatively, in order, to save on resources, the audit process may only be performed at step S211A every so often e.g. after a predetermined (or random) number of attempts.

At step S212A, node A attempts to calculate a digest value based on the keys $k_A$ and $k_B$. The calculation for such a digest may be made as described above. In the event that there is insufficient information to calculate the digest (for example if the key $k_B$ was not received from node B), an error is indicated. Otherwise, the process moves step S214A.

At step S214A, it is determined by the first node 42, node A, if the digest value calculated at step S212A matches a digest calculated at the second node 62, node B. If the digests are present and do match, the process ends at step S216A. If the digests do not match, or there is no digest available for comparison, the process moves to step S215A, where it is indicated that an attack has occurred.

Figure 6B:
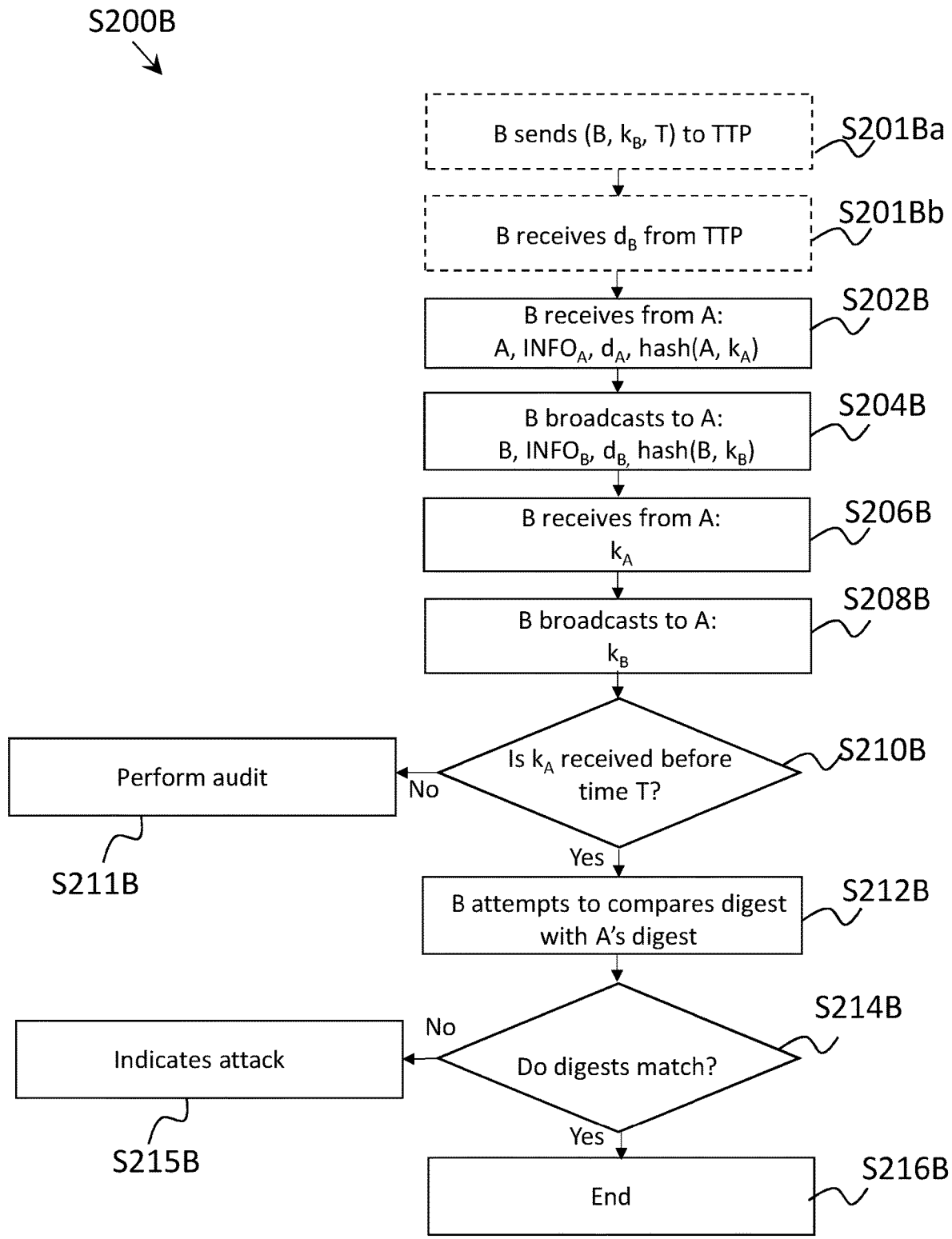
FIG. 6B is a flow chart of an implementation of the embodiment of FIG. 4 at a first device acting as a node.

Similarly, FIG. 6B shows the implementation of the process S200B at the second node 62.

In order to be able to audit the protocol, at step S201Ba, node B, which can be the second node 62, broadcasts a message to a trusted third party (TTP), which can be the server 80. The message comprises the information that is to be delayed. In response to receiving the information at step S201Ba, at step S201Bb the server 80 generates delay mechanism $d_B$, which is a cryptographic primitive delay(x, t), with the properties described above in respect of FIG. 4.

In the case of step S201Bb, $d_B$ is delay($k_B$, T). Once the second node 62 has the delay mechanism, the process can move to step S202B. At step S202B node B broadcasts a message to node A, which can be the first node 42. The message comprises the information $INFO_B$ that node B wishes to authenticate with node A. The message also comprises a standard cryptographic hash function of a key $k_B$ generated by node B and the delay mechanism $d_B$. At step S202B, the second node receives a message from node A. The receipt of the message from the first node 42 (node A), confirms the commitment of node A to the values that it has sent. In response to receiving the message from the first node 42 at step S202B, at step S204B, the second node 62 (node B) sends a similar message to the first node 42. The message of step S204B then serves as confirmation to the first node 42 that it has received the data of its message, thereby committing it to its final digest value.

The process then moves to step S206B, whereby, in response to receiving confirmation from the first node 42 that the second node 62 had received the information of step S202B from the first node 42, the first node 42 sends the key $k_A$ to the second node 62, thereby providing confirmation of receipt of the information of the message sent at step S204B having been received at the first node 42. Once such confirmation has been received, the process moves to to step S208B. At step S208B, once node B has received confirmation that node A has received its message, it broadcasts the key $k_B$ generated by node B to node A.

The process then moves to step S210B. At step S210B, node B checks whether the key $k_A$ was received from the node A within the time T specified in the delay function of the messages sent at steps S202B. If $k_A$ was received at node B before time T specified in $d_A$, then the process does not time out and the process can proceed to step S212B. If either $k_B$ was received after time T specified in $d_B$, or if it is not received at all (i.e. the communications/pairing appear to have been aborted) then the process moves to step S211B, where an audit process performed. The audit process is described with reference to FIG. 5. Alternatively, in order, to save on resources, the audit process may only be performed at step S211B every so often e.g. after a predetermined (or random) number of attempts.

At step S212B, node B attempts to calculate a digest value based on the keys $k_A$ and $k_B$. The calculation for such a digest may be made as described above. In the event that there is insufficient information to calculate the digest (for example if the key $k_A$ was not received from node A), an error is indicated. Otherwise, the process moves step S214B.

At step S214B, it is determined by the second node 62, node B, if the digest value calculated at step S212B matches a digest calculated at the first node 42, node A. If the digests are present and do match, the process ends at step S216B. If the digests do not match, or there is no digest available for comparison, the process moves to step S215B, where it is indicated that an attack has occurred.

Whilst a process for introducing a delay mechanism into a Symmetrised HCBK protocol is illustrated at FIG. 4, delay mechanisms (including those described above) can also be applied to other HISP protocols.

In further examples, the existing commitment mechanism shown at FIG. 4 (i.e. hashes and commit) can be replaced by instances of delay. In such a case, the protocol is timed out unless all delayed data is released in the open by the protocol before the delayed version of it opens. (the latter means that the switch from the existing commitment to delay has not caused an intruder to learn anything she would not already know.) If the delay mechanism is sent together with the other parts of the combined information (as in FIG. 4 rather than FIG. 7) then rather than requiring a separate audit these adapted protocols would by their nature prevent the opportunity for a man-in-the-middle to attempt to avoid detection by early termination of the process. However any adapted protocol that uses the delay mechanism as its commitment mechanism requires the nodes to wait until the delay(s) open before they can do the necessary check that the data sent later is consistent with what was hashed/committed in the original protocol.

Depending on the means of opening a delay(x, t), this might also require significant computational resource to be incurred by nodes 42/62 and this may slow the process as well as require energy. Consequently, it can be advantageous to use delay(x, t) in such a way that it does not have to be checked in a completed run of a protocol, but only when auditing a failed run (e.g. as in FIG. 5).

An example of a protocol is the following:
Delay Commit Protocol

| [A] | $d_A := \text{delay}(k_A; T)$ | |
|---|---|---|
| 1: | $A \rightarrow_N B$ | : A; $INFO_A$; $d_A$; hash(A; $k_A$) |
| 2: | $B \rightarrow_N A$ | : B; INFOB; $k_B$ |
| [A] | $\text{intime}(k_A)$ | |
| 3: | $A \leftrightarrow_E B$ | : digest($k_A \oplus k_B$; INFOS) |

Here A knows that she was committed to the final digest before the delay opened, meaning that the value received apparently from B cannot have aimed at creating any particular value of the digest. Similarly B knows that he is completely committed to the final value of the digest at the point he sends Message 2, and that he has randomised it. Therefore, although the attacker can send a fake Message 1 to B at any time (even after the delay has opened), there is nothing it can do to bias B's digest value.

Furthermore, if an attack is attempted where both digests are known to the attacker, then if A has not already abandoned the protocol on the time-out A also knows (i) her own value of the digest (because she will have received Message 2) and (ii) that if there was no attack then B will also know his value of the digest without further communication once T has passed. This allows auditing.

The above protocol can be elaborated further by also delaying $k_B$ (as $d_B$, say) and (in that case) possibly adding an acknowledgement such as hash($d_B$; $k_A$) from A to B that B must receive before the delay of $k_B$ times out.

Figure 7:
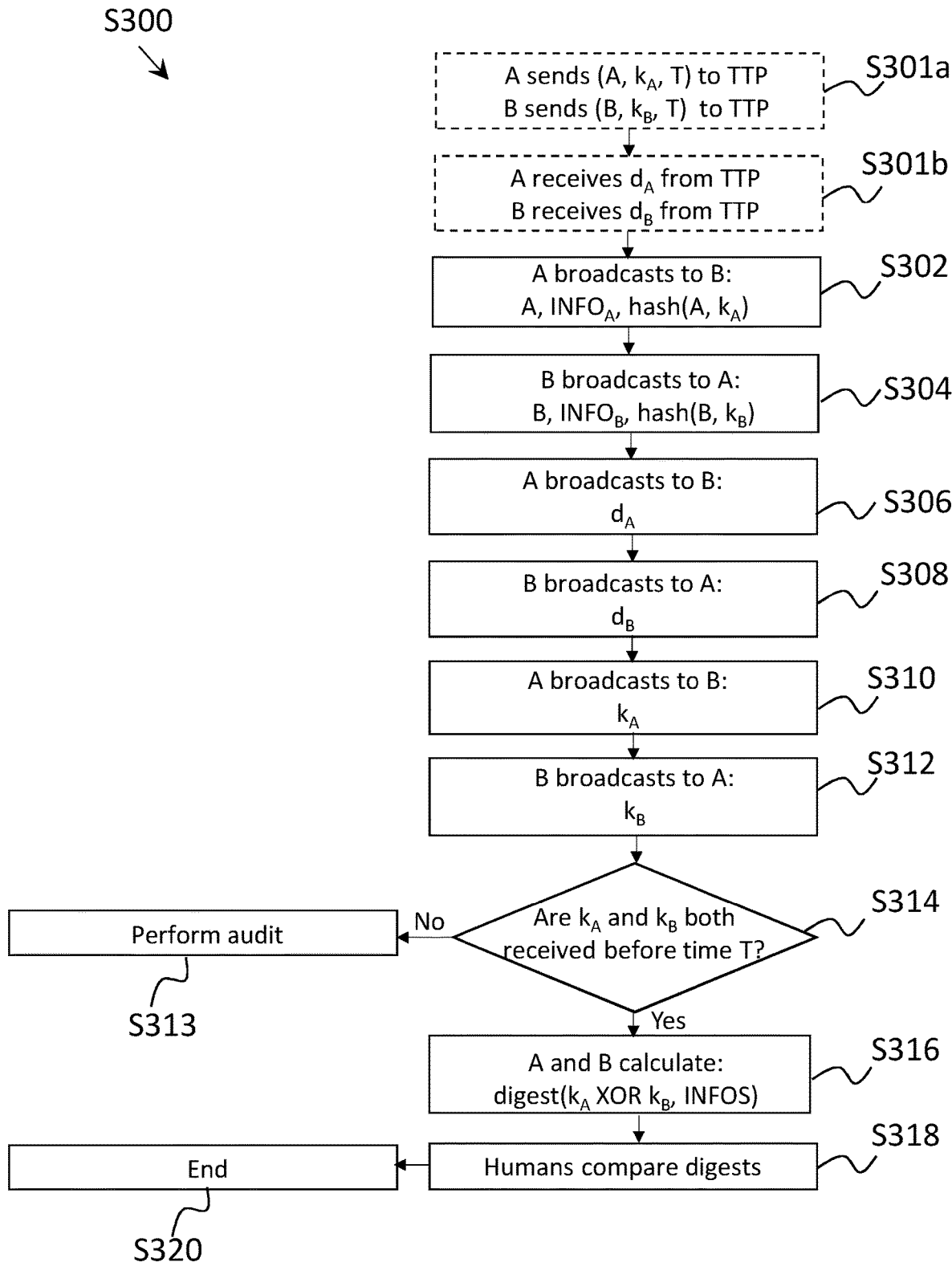
FIG. 7 is a flow chart of a protocol for authenticating two nodes according to another embodiment of the invention.

Whilst the process described in relation to FIG. 4 achieves the objectives described above, its security depends on the correctness of the delay operator. If a third party is able to break the delay mechanism to obtain the content before time T then they may be able to attack the authentication. In the event that the delay is not to be relied on as much, a further approach is described in respect of FIG. 7. FIG. 7 sets out a protocol which is auditable in the sense that the trichotomy set out above is achieved, but does not depend on the correctness of delay (in other words it would still be secure, but not reliably auditable, if an intruder were able to extract x from delay(x, T) before time T.)

FIG. 7 illustrates a flow chart S300 of a modified Symmetrised HCBK protocol performed between a first node 42, named node A and a second node 62, named node B, and a trusted third party server 80, in accordance with a further embodiment of the invention. System 40 may be used.

As described below the process S300 uses delay mechanisms d which provide for a key k to be received/known but not before a predetermined time T. Different delay mechanisms can be used and substituted for each other. A delay mechanisms d preferably includes a cryptographic primitive delay(x, t), with the following properties:

(1) Any device who knows delay(x, t) can gain knowledge of, or calculate x, but it the delay mechanism that is configured so that it is difficult to know/calculate x (and preferably as difficult as possible) until at least t units of time since its first creation).

(2) No device (that does not already know the value of x) can deduce anything about x from it before that point.

(3) In the same agent that created delay(x, T), the boolean intime(x) returns true if before T since the call of delay(x, T), and false otherwise.

One example of a delay mechanism has associated steps S301a and 3201b which are illustrated with dotted lines in FIG. 7. In this example, in order to ensure that the second node 62 does not receive the keys k before a predetermined time, T, trusted third party server 80 is used.

In order to be able to audit the protocol, at step S301a, node A, which can be the first node 42, broadcasts a message to a trusted third party (TTP), which can be the server 80. The message comprises the information that is to be delayed and is encrypted using a public key of the TTP server 80. In the example of FIG. 7, the information to be delayed includes the key $k_A$ generated by node A, along with time T, which is the time relative to the present time (rather than an absolute time) after which delayed content may be decrypted. Similarly, at step S301a, node B, which can be the second node 62, broadcasts a message to a trusted third party (TTP), which can be the server 80. The message comprises the information that is to be delayed. In the example of FIG. 7, the information to be delayed includes the key $k_B$ generated by node B, along with time T, which is the time relative to the present time after which delayed content may be decrypted.

In response to receiving the information at step S301a, at step S301b the server 80 generates delay mechanisms $d_A$ and $d_B$.

In the case of step S301b, $d_A$ includes delay($k_A$, T) and $d_B$ is delay($k_B$, T), so that $d_A$ is the combination of $k_A$ and the time when by the TTP's measure the $d_A$ should open (i.e. the time the request for to create $d_A$ was received plus T), all signed and encrypted under a key known only to the TTP. If the TTP receives such a $d_A$ (or an identifier of it), after the time it contains, it can publish $k_A$.

An example of $d_A$ would be a token y combined with a hash of ($k_A$, T). Using that example the trusted third party sever 80, responds to the receipt of the messages from the first node 42 and the second node 62 at step S301*a* by decrypting the messages with its private key and generating tokens y and y' that are sent to the first node 42 and to the second node, along with the respective with hashes of the keys $k_A$ and $k_B$ and a predetermined time, T.

Once the first node 42 and the second node 62 have the respective delay mechanisms, the process can move to step S302. At step S302 node A, which can be the first node 42, broadcasts a message to node B, which can be the second node 62. The message comprises the information $INFO_A$ that node A wishes to authenticate with node B. The message also includes a standard cryptographic hash function of a key $k_A$ generated by node A As will be described below in relation to step S316 a digest will be calculated as a function of combined information which includes $k_A$. Because elements of the broadcast message in step S302 are based on $k_A$, and the remaining parts of the combined information that originate from node A were also included, following step S302, node A has committed to its contribution to a final value of a digest that is calculable from combined information obtained from node A and node B. Node A is committed to this final value even though it cannot yet know or calculate would it will be (because it doesn't yet have the required information from Node B). Accordingly FIG. 7 includes an example of a commitment scheme.

After step S302 the process then moves to step S304. At step S304, node B broadcasts a message to node A. The message comprises the information $INFO_B$ that node B wishes to authenticate with node A. The message also comprises a standard cryptographic hash function of a key $k_B$ generated by node B.

Following step S304, node B has committed to its contribution to a final value of a digest that is calculable from combined information obtained from node A and node B.

The process then moves to step S306. At step 306 where node A sends a message to node B, which message comprises the delay mechanism $d_A$, as described in relation to step S301*b*. In the case of step S306, $d_A$ is delay($k_A$, T).

The process then moves to step S308, where node B sends a message to node A, which message comprises the delay mechanism $d_B$, as described in relation to step S301*b*. In the case of step S308, $d_B$ is delay($k_B$, T).

The process then moves to step S310. At step S310, once node A has received knowledge that node B has received its message, it broadcasts the key $k_A$ generated by node A, to node B.

The process then moves to step S312. At step S312, once node B has received knowledge that node A has received its message, it broadcasts the key $k_B$ generated by node B, to node A.

The process then moves to step S314. At step S314, each of node A and node B check whether the keys $k_A$ and $k_B$ were received from the other node before the time T specified in the delay function of the messages sent at steps S306 and S308. If either $k_A$ was received at node B after time T specified in $d_A$, or $k_B$ was received at node A after time T specified in $d_B$, or if no key was received at either node A or node B by time T, then the process moves to step S313, where an audit of the protocol may be performed. The audit process is described with reference to FIG. 5. If both $k_A$ and $k_B$ were received before times T specified in $d_A$ and $d_B$, then the process moves to step S316.

Once node A has received the two messages from node B, and node B has received the two messages from node A, at step S316, node A and node B each calculate a digest value based on the keys $k_A$, $k_B$ the information broadcast from each node to the other node. The calculation for such a digest may be made as described above in relation to FIG. 3.

The process then moves to step S318, where the digest values are displayed at an output of the nodes, for example, output 50 of the first node 42 and output 70 of the second node 62. A comparison of the digests calculated by each of node A and node B at step S314 is then compared at step S318. The comparison is thus made over an empirical channel, for example by humans.

The process then ends at step S320.

Again the hash values may be checked during the process in a conventional manner.

The delay mechanism described above uses a trusted third party server 80 to ensure that the content of the message sent from the first node 42 to the second node 62 (and vice versa) is only released to the node to which it is sent after a predetermined time T. The alternatives to the delay mechanisms described in relation to FIG. 4 can also be applied to the protocols shown in FIG. 7.

In a similar way to the way in which the method of FIG. 4 can be implemented at each of two nodes, as shown in relation to FIGS. 6A and 6B, the process of FIG. 7 can also be implemented by programmed steps at each of two separate nodes.

The process S2000 of auditing a failed protocol is shown at FIG. 7 and applies to the protocol of flow chart S300 in a similar way to described above with respect to FIGS. 4, 6A and 6B.

In an example (such as that described above in relation to steps S301*a* and S301*b*) where a trusted third party server 80 is used to provide the delay mechanism, the respective nodes A and B will have received the tokens y' and y each other at step S302 following their generation by the trusted third party server 80, where the tokens can be used to identifier the remainder of $d_A$ and/or $d_B$. The auditing process, as described with reference to FIG. 5 commences at step S313 of FIG. 7, when, for example, either $k_A$ or $k_B$ are not received and time T passes.

The first node 42 and the second node 62 can use the tokens to obtain the keys $k_A$ or $k_B$ from the trusted third party server 80, after the time, T, specified in the delay mechanism associated with the delays $d_A$ and $d_B$. In the event that either A and/or B does not receive a token from the TTP at step S2002, no meaningful attack has taken place because an attacker Eve cannot have both digest values to compare and therefore the audit is terminated.

After receipt of a token from one of both of A and B at step S2002, the server 80 uses the token(s) to look up the remainder of $d_A$ and/or $d_B$ including their time T. At step S2004 determines whether the predetermined relative time, T, disclosed in the delay mechanism $d_A$ and $d_B$, has elapsed since the delay mechanisms were generated. If the time T has not elapsed, the server 80 rejects any request for the keys $k_A$ and/or $k_B$ to be revealed. Once the times have elapsed, the process can move to step S2006, whereby the values $k_A$ and $k_B$ are sent to the respective nodes A and B. Rather than do this automatically a rejection at step S2004 (i.e. when a request is received too early) can send process S2000 back to before step S2002 to await a further request before proceeding.

In further examples, the tokens y and y' may in themselves contain the information that the trusted third party server 80 requires to recover the time T and/or keys $k_A$ and $k_B$ without resorting to the memory 86 (such as by use of encryption). Instead of sending the token y from the trusted third party server 80 to the first node 62 upon receipt of the message from the first node 42, the trusted third party server 80 may receive the communication from and/or send the token y to the second node 42, relaying on communication between the nodes or being given one node's address by the other node.

The process then moves to step S2010 where it is determined whether $k_A$ and/or $k_B$, were recovered from the other node A/B (at step S310/S312). If either of the keys $k_A$ and $k_B$ were not received (e.g. the process was aborted), then the process moves to step S2012. The appropriate hash functions are applied to $k_A$ and/or $k_B$, as received from the trusted third party server 80, and the resultant hashes are compared to the hashes of $k_A$ and/or $k_B$, as received at the nodes A and B in the original messages of steps S302 and S304, as shown at FIG. 7.

If it is determined that the hashes of $k_A$ and/or $k_B$, as received from the trusted third party server 80, do not match the hashes of $k_A$ and/or $k_B$, as received at the nodes A and B in the original messages of steps S302 and S304, the process moves to step S2020, whereby one or both nodes indicate that an attack was attempted. An indication at one node can be provided to the other node.

If it is determined that the hashes of $k_A$ and/or $k_B$, as received from the trusted third party server 80, do match the hashes of $k_A$ and/or $k_B$, as received at the nodes A and B in the original messages of steps S302 and S304, the process moves to step S2014, whereby the digests values are calculated at each of node A and node B using the keys received from the sever 80 at step S2008 and are then compared with one another such as over the empirical channel. If the digests do not match, the fact that there is a mismatch (or the digests themselves) are input into one or both nodes and the process moves to step S2020. At step S2020 it may be indicated to a user by one or both nodes that a man-in-the-middle attack occurred and was abandoned because the man-in-the-middle attacker was unsuccessful in their attempt to generate values for $k_A$ and $k_B$ that would result in matching digests. If the digests do match, the process moves to step S2018, whereby it may be indicated that the error to receive the keys before time T was not due to an attack, but rather due to another failure of the system (such as a communication failure).

If the values of $k_A$ and $k_B$, were received from one of the nodes A and B (from step S310/S312), the process moves to step S2011, where an internal check of the values of $k_A$ and/or $k_B$ is received from the server 80 (S2008) and the other node (S206/S208) is made. If the $k_A$ and/or $k_B$ received from the server 80 (S2008) and the other node (S310/S312) values do match, the process reverts to step S2012, as described above.

If the of $k_A$ and/or $k_B$ is received from the server 80 (S2008) and the other node (S310/S312) values do not match, the process moves to step S2020, whereby one of both nodes indicate that an attack was made by a man-in-the-middle attacker.

Therefore, even if no value for $k_A$ or $k_B$ has been received, an audit can be performed in order to differentiate between communications failure and a failed attack.

In other words, after each of the two parties A and B is completely committed to the final value of the digest it sends the other one the delayed reveal of its hash key, and is only prepared to do the digest comparison if it has received the unencrypted hash key from the other before any party can have extracted the data from the respective $d_X$. It follows that in order to know whether the usual man-in-the-middle attack will work, Eve either has to wait for delay($k_A$,T) and delay($k_B$, T) to open or to get A to send the open $k_A$ and B to send $k_B$. If she does the first she will know if her attack would have succeeded earlier, but it will not now because the booleans tested by A and B at step S314 will be false. If she takes the second approach she will have to have at the very least sent data representing $d_A$ to B and $d_B$ to A as a continuation of her man-in-the-middle attack. However if she does, gets the values of $k_A$ and $k_B$ and abandons the attack, all A and B have to do is wait. After time T they can endeavour to open the delayed values and one of two things will happen:

(1) The ds they hold open successfully, are consistent with the hashes they hold, and A and B can compare $s_A$ and $s_B$ and find that they are different.

(2) The ds do not open successfully or are not consistent with the Message 1 contents at steps S302 and S304.

The second of these possibilities is unlikely, for if it happens then it would provide post-hoc evidence that the intruder was involved even if Eve had got lucky with the short strings: she would have had to have provided a d inconsistent with the Message 1 she sent to the same party before she knew if the two runs' short strings agreed.

In either case, A and B can jointly deduce that an effort had been made to attack them. The revised protocol achieves the trichotomy above. Note that even if the delay function does not work at all, it is known with confidence that this protocol is still as secure as the original SHCBK presented above: for the original protocol fully reveals $k_A$ and $k_B$ at the points where the two delayed versions are revealed.

Whilst the process for introducing a delay mechanism into a Symmetrised HCBK protocol is illustrated at FIG. 7, the delay mechanism can also be applied to other protocols in the same manner, thereby allowing the protocols to be audited in the event that they do not complete.

An alternative delay mechanism to the use of trusted third parties (TTPs) is the creation a computation that takes (or at least is very likely to take) at least a given time to perform by any party. Such computation based delay mechanisms may be used instead or as well as of mechanism which use trusted third party servers for any of the auditable protocols.

The use of trusted third party servers can be advantageous as avoids relatively low power computers such as smart phones having to perform intensive calculations to audit a run, and the greater relative differences in speed between these devices and the ones attackers may have available. In other circumstances creating a computation can be advantageous because it avoids the possibility of trusted third parties being corrupted and reduces the number of devices that are required to communicate. For example if two devices pair with each other using a communication protocol/channel with limited range it may not be desirable to also communicate with some more remote server, It is desirable that the sort of devices running the protocols (e.g. nodes 42 and 62) are able (as part of the auditing process) to be able to open a value computed for delay (e.g. dS or dB) in a small multiple (say 10) of the time it will take an attacker with essentially unbounded computing resources to do this. To achieve this it is advantageous that the computation is sequential, in the sense that it is difficult/impossible to parallelise. Potential schemes may be based on a long sequence of operations. Three possibilities are:

(1) A large prime p of the form 3 m+2 is chosen (these are exactly the primes in which cubing $x^3$ is invertible, the value determining a time delay t. delay(x, t)=$x^3$ mod p is fast to compute, but to uncover x from this it is necessary to compute $x^d$ mod p where d is chosen so that p−1 divides 3d−1. This will typically take ($\log_2$ p)/2 times longer to compute, namely a computational advantage proportional to the number of digits in p (the calculation of $x^3$ will clearly take more time, the more digits there are —note that there are multiplication algorithms faster than the usual "schoolbook" one that can be expected to give significant advantages when p is very long). To achieve a sufficient delay it may be necessary to make p very large indeed; as an alternative this operation could be repeated with several increasing primes in turn. The primes in this example could be published and used by all nodes. In cases where x has insufficient entropy to prevent searching attacks, it is preferably augmented by a suitable random nonce before the operations above are carried out.

(2) A known case where encryption is much cheaper than decryption is low-exponent RSA, where the encryption key is only a few digits long (sometimes e=3) and the decryption key d is the same order as the base N. This may not work well in case described because if an agent published $(x^e,d)$ as delay(x, t), the use of a standardised e, or even an e chosen from a reasonably small range, would allow an attacker to deduce e and therefore the factorisation N=pq thanks to an attack on RSA set out in the prior art that shows that from (N, e, d) one can calculate (p, q) efficiently to a high probability. Even if this attack was too slow to unravel the factorisation the first time the base N was used, this would mean that N could not be re-used. Since the calculation of p and q is itself time-consuming, this makes this particular possibility unattractive.

(3) A problem with the above is that the exponent used by the creating agent is exposed because it is drawn from a small range. This problem could be avoided by using huge-exponent RSA instead, where huge means unnecessarily high. The idea here is that an RSA base N=pq is chosen, and delay(x, t)=(N, $x^e$,D), where D is an integer typically much larger than N (and may be efficiently presented as (d,r) representing D=d×$2^r$ for d a small integer). e is calculated from D in the usual manner of RSA but, as far as an outsider is concerned, will be drawn from a very large space and so not be searchable for. The lack of knowledge of p and q will mean that it is impractical to reduce D to a smaller, equivalent, exponent.

delay(x, t) is then $x^e$ mod N, which is opened by raising to the power D, coupled with N and D. N, and if desired (e, D) can be re-used by this agent, but the same attack as above where (p, q) are computed from (N, e, d) means that each agent must have its own N.

Whilst FIGS. 4 and 7 described a version of SHCBK between two nodes, the protocol can also be applied to a larger group of nodes. The group version follows the pattern above except that now an arbitrary-sized pre-arranged group G of parties are involved (whose identities are known to the human(s) implementing the oob channels, and the distinct initiator/responder roles implied by the earlier description disappear. The notation $\forall A$ is used in the sender of the message to mean that each agent in the sends this message, and $\forall A'$ as the receiver means the message is sent to all other members of the pre-agreed group. No agent moves on from one message to the next until it has received as well as sent all that it is expected of it in the present stage.

Group SHCBK

| | | |
|---|---|---|
| 1. | $\forall A \rightarrow_N \forall A'$: | A, INFO$_A$, hash (A, k$_A$) |
| 2. | $\forall A \rightarrow_N \forall A'$: | k$_A$ |
| 3. | $\forall A \leftrightarrow_E \forall A'$: | digest (k* INFOS), |

Where k* is the XOR of all the k$_A$'s for A ⊆ G

The differences between this and the auditable version exactly parallel the pairing version. Below the two non-message lines are ones executed between the corresponding pair of messages by each agent separately. Thus each A calculates its individual d$_A$ between completing Message 1 and starting Message 2, and refuses to pass from Message 3 to Message 4 if it has failed to complete its sends and receipts of Message 3 before the lifetime of its own d$_A$ runs out.

Auditable Group SHCBK

| | | |
|---|---|---|
| 1. | $\forall A \rightarrow_N \forall A'$: | A, INFO$_A$, hash (A, k$_A$) |
| | $\forall A$ d$_A$ := delay (k$_A$, T) | |
| 2. | $\forall A \rightarrow_N \forall A'$: | d$_A$ |
| 3. | $\forall A \rightarrow_N \forall A'$: | k$_A$ |
| | $\forall A$ intime (k$_A$) | |
| 4. | $\forall A \leftrightarrow_E \forall A'$: | digest (k* INFOS), |

Where k* is the XOR of all the k$_A$'s for A ⊆ G

This maintains the property of SHCBK that if two members A and B of a group are trustworthy, even though the rest of G is not, then the successful completion of the protocol implies that A's and B's data is successfully authenticated to each other. Furthermore, if in a man-in-the-middle attack the intruder abandons the attack at a point where she knows both A's and B's short strings, then A and B can detect any difference in these after the appropriate waits. In other words the audibility property holds good between any pair of trustworthy members of G.

The protocol can also be adapted for a shortened version of pairwise SHCBK where only one of the two keys is hashed.

Shortened SHCBK

| | | |
|---|---|---|
| 1. | A $\rightarrow_N$ B: | A, INFO$_A$, hash (A, k$_A$) |
| 2. | B $\rightarrow_N$ A: | B, INFO$_B$, h$_B$ |
| 3. | A $\rightarrow_N$ B: | k$_A$ |
| 4. | A $\leftrightarrow_E$ B: | digest(k$_A$ ⊕ k$_B$; INFOS) |

Various auditable versions of this are possible. A preferred version resembles the unshortened version, but adds an extra delayed term into the second message.

Auditable Shortened SHCBK

| | | |
|---|---|---|
| 1. | A $\rightarrow_N$ B: | A, INFO$_A$, hash (A, k$_A$) |
| [B] d$_B$: = delay(k$_B$, T) | | |
| 2. | B $\rightarrow_N$ A: | B, INFO$_B$, hash (B, k$_B$), d$_B$ |
| 3. | A $\rightarrow_N$ B: | k$_A$ |
| 4. | B $\rightarrow_N$ A: | k$_B$ |
| [B] intime (k$_B$) | | |
| 5. | A $\leftrightarrow_E$ B: | digest(k$_A$ ⊕ k$_B$; INFOS) |

Given that k$_B$ is delayed in Message 2, it cannot be sent openly. Therefore it is sent later. It is additionally sent as a hash in Message 2 so that A is committed to k$_B$ without the need to wait for the delayed value to open.

It might seem odd that this has been termed an auditable version of the shortened SHCBK rather than the longer pair version. This is explained by the observation that if the implementation of delay for some reason fails and reveals its contents too soon, the security argument reverts to that of shortened SHCBK.

The process for adapting protocols can also be applied to the ZRTP protocol.

Auditable ZRTP

```
1.          A →_N B:     hash(g^{x_B})
[B]         dB := delay (g^{k_B}, T)
2:          B →_N A  :   d_B, hash(B,g^{x_B})
3:          A →_N B  :   g^{x_A}
4:          B →_N A  :   g^{x_B}
[B] intime(g^{k_B})
5:          A ↔_E B  :   shorthash(g^{x_A}, g^{x_B})
```

The reason for including B's name in the hash in Message 2 is the same reason it is included in SHCBK: it prevents reflection attacks where A's own $g^{x_A}$ replayed to her in Message 2.

Other auditable variants of this protocol and shortened SHCBK are also possible, including one where delayed versions of both $g^{x_A}$ and $g^{x_B}$ are used. Finally the indirect binding Vaudenay protocol is described in an adapted form. Adaptation of the Vaudenay protocol, is performed in much the same way as in the previous two cases, both delay $R_B$ and allow its eventual send to be checked against an earlier commitment. Because $R_B$ is short the best way of doing this is using the same sort of commit construct as for $R_A$, and in that context any information B wants to authenticate to A might be added (which could of course be null).

Auditable Vaudenay Style Protocol:

```
c_A || d_{c_A} := commit (INFO_A;R_A)
1.     A →_N B : INFO_A, c_A.
c_B := || d_{c_B} := commit(INFO_B;R_B)
d_{y_B} := delay(R_B,T)
2.     B →_N A: INFO_B, c_B, d_{y_B}
3.     A →_N B: dc_A
[B] R_A := open(INFO_A, c_A, d_{c_A})
B computes RA = open (INFOA, c, d)
[B] intime (R_B)
4.        B →_N A: dc_B
[A] R_B := open(INFO_B, c_B, d_{c_B})
5.     A →_E B: R_A ⊕ R_B
```

The principles that have been followed in adapting the protocols above are:
(i) An agent A only sends out delayed information at or after the point in the original protocol where A sent it openly.
(ii) Agents are committed to items of data as soon as they were in the original protocol.
(iii) A only sends the contents of the delayed message at a time when it knows that (if all messages received are what they seem) it has the information to eventually compute the short string.
(iv) The message which reveals the short string to the last agent to know it (second in the case of pairing) reveals a randomiser which is already held by the receiver in delayed form.

It is advantageous to use the approach to audibility described above, in which the basic security of the protocol is not compromised by the use of a delay mechanism which proves to be insecure. However there are alternative versions with fewer messages akin to the protocol in FIG. 4 that do not have this advantage.

A variety of protocols based on commitment schemes can be made auditable by the addition of additional data fields and/or messages. These transformations involve the addition of time-dependent data to replace or supplement the mechanisms already present to commit agents to data before they know it. This can be done straightforwardly if the security of the delay mechanism can be sufficiently relied upon, and in a way that does not risk the security of the original protocols otherwise.

Examples of how delay might be implemented are described, observing that what method is preferable will depend on context. Indeed, a single protocol implementation might well use different delays as alternatives (e.g. depending on the availability of TTPs.)

One of the assumptions that has been made is that when a properly formatted message is received by a node over-→_N that can be shown to be not consistent with the protocol, an attack is diagnosed. In order to make this reasonable, when implementing the protocol it should preferably be ensured that accidental corruptions, mis-deliveries and abbreviations of messages are not accepted as "messages" at all. This can be achieved by using very explicit message formatting, e.g. in XML, and by including integrity information such as hashing to help prevent accidental issues relating to messages sent between trustworthy parties ever leading to a node thinking it has received a message that was not sent to it in the form that was sent. Such precautions will not prevent an attacker from sending messages that look real, but should mean that agents can reject accidentally corrupted messages.

The protocols considered above have three properties:
(1) The oob channel is used simply for comparing two short strings.
(2) This comparison takes place at the end of the protocol.
(3) Each side of the protocol introduces something that randomises these strings.

Other protocols that have these properties and can be made auditable using the techniques set out here including later versions of Bluetooth. There are other sorts of protocols, all still working by commitment before knowledge, which do not have one or more of the above.

The following protocols are considered optimal for adaptation in the way described above. Descriptions of them all can be found in the paper "Authentication protocols based on low-bandwidth unspoofable channels: a comparative survey" by L H Nguyen and A W Roscoe published in the Journal of Computer Security, 2011

- The Cagalj-Capkun-Hubaux two-way authentication protocol, which is essentially the same as the Vaudenay protocol in its symmetrised form, which is used for the form that is audited.
- The Pasini-Vaudenay two-way authentication protocol, which uses a mixture of direct and indirect binding.
- The improved version of Wong-Stajano, which has similarities with all three of SHCBK, the Vaudenay protocol and ZRPT.
- The Laur-Nyberg pairwise protocol.
- Pairwise authentication scheme in Vaudenay's style. This is identical to what is described as "Shortened HCBK".
- "Improved Hoepman". This is essentially identical to ZRPT.
- Indirect-binding group protocol.
- De-symmetrised SHCBK. This is a group protocol which reduces to Shortened SHCBK for groups of size 2.

Some protocols use only one randomiser in pairing, or less than the group size for larger numbers. Sometimes this is because all the messages pass from a distinct "sender" node to one or more "receivers", and the objective is to pass a message from the former to the latter. Some protocols that achieve this use only messages from A (sender) to B (receiver), including the out-of band ones.

An interesting but non-optimal version of this is V-MANA I, where at least twice as many bits need to be transmitted for the same level of security:

V-MANA I

1. $A \rightarrow_N B$ : A, $INFO_A$
A picks a b-bit random number k
2. $A \rightarrow_{SE} B$ : k, digest (k, A || $INFO_A$)

B verifies the digest

To make this work the oob channel is required to be "strong", namely instantaneous, explaining the subscript SE above.

Unfortunately, the above protocol does not even achieve $2^{-b}$ security with its 2b bits because the digest specification seen earlier cannot be satisfied: the length of k needs to be increased significantly to achieve this.

An improved version of the above protocol in which a long k was pre-committed rather than a short one sent alongside the digest is:

Improved Version of MANA I

1. $A \rightarrow_N B$ : $INFO_A$, hash(k)
2. $A \rightarrow^t_{BE} B$ : digest (k, $INFO_A$)
3. $A \rightarrow_N B$ :k B then verifies the hash and the digest Here-$\rightarrow^t_{BE}$ is an out of band channel that is guaranteed to deliver within t time. B must not accept a Message 2 within t of accepting Message 1, and A must not send Message 3 until more than t has passed since she sent Message 2.

This protocol has the same problems as all of the ones considered earlier in terms of attackers being able to pass off a failed attack as a communications failure. It is supposed that the attacker wants to replace $INFO_A$ by $INFO'_A$. She does this in Message 1 and also replaces hash(k) by hash(k'), where she knows k'. She then observes digest(k, $INFO_A$). Since she already knows digest(k', $INFO'_A$), she can now see if they are equal and her attack will succeed, or whether B will see the difference when he computes digest(k', $INFO'_A$), the only value possible since he will check whatever key he receives against hash(k').

If they are equal the attacker proceeds to send k' as Message 3 to B, in place of the one A sends. Otherwise she can just stop Message 3 getting through and it will look like a communications failure.

This protocol can be made auditable exactly as previously if the need to worry about the security of delay is not present: simply accompany Message 1 with delay(k.T), where T>3t. A is then obliged to send Message 2 within 2t of creating the delay, so it is bound to the received by B by 3t. It follows that since T is to be greater than 3t, the delay will not have opened by then. Furthermore B will certainly have received something purporting to be delay(k, T) at least t time ago.

Eve cannot detect the difference in digests until B has received Message 2, and so cannot abandon an attack on account of this difference before B has the means to detect the difference (proving the attack) after waiting for the delay(k, T) he has received to open, with as before the possibility of an inconsistency also being discovered.

As before, there is the alternative of ensuring that even an insecure delay compromises no more than audibility.

Auditable Improved MANA I

1. $A \rightarrow_N B$ : $INFO_A$, hash(k)
2. $A \rightarrow^t_{BE} B$ : digest (k, $INFO_A$)
3. $A \rightarrow_N B$ :delay(k,T)
4. $A \rightarrow_N B$ :k B then verifies the hash and the digest Here, it is ensured:
(1) Message 2 is not accepted until at least t after receiving Message 1.
(2) Message 3 is not sent until at least t after A sends Message 2.
(3) If B does not accept a Message 3 until 2t after receiving Message 2, it abandons the protocol run.
(4) Message 4 is not sent until A knows that B will either have received Message 3 or abandoned the run, namely not until 3t since sending Message 2.

Thus it is desirable to have a slightly more elaborate sequence of steps based on timing than in the original protocol to ensure audibility. Just as with the protocols considered above, it is ensured that the sequence of commitment, possession of delay information, and potential learning of the substantive randomiser by the attacker before the delay opens, so that it cannot be meaningfully attacked.

This was achieved above by interleaving the disclosure of two randomisers. Here it has been done by explicit timing.

A third possibility is used in HISPs: some protocols have agents indicate explicitly when they are committed over the oob channel. For example all the timing requirements could be removed on the above protocols by having B say committed over an oob channel to B between each of the messages.

A more sensible example is given by HCBK, the predecessor of SHCBK.

HCBK Protocol

0. $I \rightarrow_N \forall S$ : I
1. $\forall A \rightarrow_N \forall A'$: (A, $INFO_A$)
2a. $I \rightarrow_N \forall S$: hash($k_I$)
2b. $\forall S \rightarrow_E I$: committed
3. $I \rightarrow_N \forall S$: $k_I$
4a. $\forall A$ displays: digest ($K_I$, INFOS), init(I, A)
4b. $\forall A \rightarrow_E \forall A'$: Users compare and check presence of I This is a group protocol in which the initiator I is a member of the group, and all the other nodes are indicated by $\forall A$ above. $\forall S$ represents all of the non-initiator nodes. There is only one randomiser $k_I$, to which all the A are committed via hash($k_I$), and must say they are committed in an unforgeable way, before it is released in Message 3. This can be made auditable as follows:

Auditable HCBK Protocol

0. $I \rightarrow_N \forall S$ : I
1. $\forall A \rightarrow_N \forall A'$: (A, $INFO_A$)
2a. $I \rightarrow_N \forall S$: hash($k_I$)
2b. $\forall S \rightarrow_E I$: committed
3a. $I \rightarrow_N \forall S$: delay ($k_I$, T)
3b. $\forall S \rightarrow_E I$: committed
I: intime($k_I$)
4. $I \rightarrow_N \forall S$: $k_I$
5a. $\forall A$ displays: digest ($K_I$, INFOS), init(I, A)
5b. $\forall A \rightarrow_E \forall A'$: Users compare and check presence of I Here each A insists on receiving Message 3 within T of sending its Message 2b, and I does not send Message 4 until T has passed since sending Message 3. Thus Message 4 is certainly not released until each A has either given up or received Message 3a.

With good reason, most of the protocols of the type considered use their short strings at the end to confirm authentication. This seems good from the point of view of human understanding and to minimise human effort. However it is possible to create protocols where short strings are communicated or compared mid-way. [It seems difficult to have such an exchange at the start of an optimal protocol.]

Above examples of this are shown in the improved MANA I protocol and its auditable versions. A further example of this appears in the following, an indirect binding protocol related to the Vaudenay style.

Protocol with Late Decommit

| 1. | $A \rightarrow_N B : INFO_A, hash(INFO_A, R_A, N_A)$ |
| 2. | $B \rightarrow_N A : INFO_B, hash(INFO_B, R_B, N_B)$ |
| 3. | $A \rightarrow_N B : R_A$ |
| 4. | $B \rightarrow_N A : R_B$ |
| 5. | $A \rightarrow_E B : R_A \oplus R_B$ |
| 6. | $A \rightarrow_N B : N_A$ |
| 7. | $B \rightarrow_N A : N_B$ |

Imagine the intruder carrying out the standard man-in-the-middle attack on this protocol. As usual she will have separate values for all the data items in the two runs. Her attack will ultimately succeed if and only if the two short strings, namely $R_A \oplus R_B'$ and $R_A' \oplus R_B$ agree, where $R_A'$ and $R_B'$ are the values Eve introduces in the two runs.

It may seem like a good idea for her to make sure that these two short strings do agree by renewing the choice of $R_B'$ in her Message 4 to Alice after receiving $R_B$ from Bob. However ultimately this will not work if this value is different from the $R_B'$ already used in Message 2, since for it to do so would require a (second preimage) hash collision to be created by Eve.

So to make this protocol auditable it needs delayed audit material to be in the hands of Alice and Bob before Eve knows the values of the two short strings: postponing some of the linking data has not postponed the timing of the audit material. One way to achieve this for the above protocol is to exchange delayed material prior to the exchange of Messages 3 and 4 in the above:

Auditable Protocol with Late Decommit

| 1. | $A \rightarrow_N B : INFO_A, hash(INFO_A, R_A, N_A)$ |
| 2. | $B \rightarrow_N A : INFO_B, hash(INFO_B, R_B, N_B)$ |
| [A] $d_A$ := delay(($R_A$, NA), T) | |
| 3. | $A \rightarrow_N B : d_A$ |
| [B] $d_B$ := delay (($R_B, N_B$), T) | |
| 4. | $B \rightarrow_N A : d_B$ |
| [A]intime ($R_A, N_A$) | |
| 5. | $A \rightarrow_N B : R_A$ |
| [B]intime ($R_B, N_B$) | |
| 6. | $B \rightarrow_N A : R_B$ |
| 7. | $A \rightarrow_E B : R_A \oplus R_B$ |
| 8. | $A \rightarrow_N B : N_A$ |
| 9. | $B \rightarrow_N A : N_B$ |

The security argument for this protocol is slightly more complex than for previous ones, because if delay is insecure then the above protocol releases $N_A$ and $N_B$ before rather than after the comparison. However the delay till after the comparison in the original protocol is not important for security.

It is shown that the careful use of delay enables the creation of auditable versions of a very large number of protocols employing the commit-before-knowledge principle. Each such protocol can be made auditable in the weak sense where the security argument now depends on the correctness of delay, but it seems likely that almost every such protocol can be made auditable in the strong sense also.

The invention claimed is:

1. A computer implemented method of authenticating communication between a first node and a second node, using a function of combined information obtained from at least one of the nodes, the method comprising:
   sending a commitment message from the first node to the second node, the message containing content based on at least a first part of the combined information, which content commits the first node to a first value of the function, and wherein the first part of the combined information is communicated from the first node to the second node with a delay mechanism that only allows the first part of the information to be determined by the second node after a predetermined time; and
   in response to receiving notification at the first node that the second node has received the message, which receipt commits the second node to the first function value:
   sending a subsequent message comprising the first part of the information from the first node to the second node, or waiting until after the predetermined time; and
   in response to the second node receiving the subsequent message before the predetermined time, or in response to waiting until after the predetermined time:
   compiling the combined information at the second node by combining the first part of the information, obtained from the subsequent message or determined after the predetermined time using the delay mechanism, with the remainder of the combined information at least part of which has been received from the first node,
   calculating the function of the combined information at each of the first node and the second node, thereby to enable comparison of the calculated function values of each node using an empirical channel.

2. The computer implemented method according to claim 1, wherein if the subsequent message was received after the predetermined time:
   aborting the authentication, wherein a function value is calculable and comparable after the predetermined time from the first part of the combined information communicated with the delay mechanism.

3. The computer implemented method according to claim 1, wherein
   in response to the authentication being aborted:
   performing an audit of the communication between the nodes, wherein the audit comprises: the second node determining the first part of the information after the predetermined time in accordance with the delay mechanism; and
   the second node comparing the content based on at least a first part of combined information content from its receipt of the commitment message with a corresponding value based on the first part of the information determined after the predetermined time.

4. The computer implemented method according to claim 1, wherein
   in response to the authentication being aborted:
   performing an audit of the communication between the nodes, wherein
   the audit comprises: the second node determining the first part of the information after the predetermined time in accordance with the delay mechanism;

compiling the combined information at the second node by combining the first part of the information determined after the predetermined time with the remainder of the combined information at least part of which has been received from the first node, and calculating the function of the combined information, compiled using the first part of the information determined in accordance with the delay mechanism, at each of the first node and the second node, thereby to enable comparison of the calculated function values of each node using an empirical channel.

5. The computer implemented method according to claim 1, wherein the delay mechanism is a computation which reveals the first part of the information, which computation is configured so that the processor of a node takes at least the predetermined time to complete it.

6. The computer implemented method according to claim 1, wherein the delay mechanism comprises the use of a server, that is in communication with one or more of nodes, to store the first part of the information and only allow access to the first part of the information after the predetermined time.

7. The computer implemented method according to claim 6, wherein
the first part of the combined information, is communicated to the server by the first node; wherein the server will only release the content to the second node after the predetermined time.

8. The computer implemented method according to claim 7:
wherein communicating the first part of the combined information from the first node to the second node with a delay mechanism comprises sending a token from the first node to the second node, and in response to receiving the token after predetermined time the server sends the first part of the combined information to the second node.

9. The computer implemented method according to claim 1, wherein the first part of the combined information communicated from the first node with a delay mechanism is included in the commitment message.

10. The computer implemented method according to claim 1, wherein the first part of the combined information communicated from the first node with a delay mechanism is communicated subsequent to the commitment message.

11. The computer implemented method according to claim 1 wherein the delay mechanism is used to base the content of the commitment message on (at least) the first part of the combined information, so that the first part of the combined information is communicated from the first node to the second node with a delay mechanism by sending the commitment message.

12. The computer implemented method according to claim 1, wherein the function creates a predetermined number of output bits from multiple inputs.

13. The computer implemented method according to claim 1, wherein the commitment message is altered or replaced between being sent from the first node and being received by the second node.

14. The computer implemented method according to claim 1, wherein the first part of the combined information is a randomiser, preferably requiring a guess of at least 256 bits to deduce it.

15. The computer implemented method according to claim 1, wherein the remainder of the combined information comprises information to be authenticated, such as a symmetric or asymmetric key.

16. The computer implemented method according to claim 1, wherein the content based on at least a first part of the combined information is a hash of one or more values including at least the first part of the combined information, and is preferably created using a cryptographic hash function.

17. The computer implemented method according to claim 1, wherein the method of authenticating communication comprises the steps of communicating the following messages:

| | | |
|---|---|---|
| 1. | $A \rightarrow_N B$ : | hash($g^{x\_B}$) |
| [B] dB:= delay($g^{k\_B}$, T) | | |
| 2. | $B \rightarrow_N A$ : | $d_B$, hash(B,$g^{x\_B}$) |
| 3. | $A \rightarrow_N B$ : | $g^{x\_A}$ |
| 4. | $B \rightarrow_N A$ : | $g^{x\_B}$ |
| [B] intime($g^{k\_B}$) | | |
| 5. | $A \leftrightarrow_E B$ : | function($g^{x\_A}$, $g^{x\_B}$) |
| preferably wherein step 5 comprises | | |
| | $A \leftrightarrow_N B$ : | shorthash($g^{x\_A}$, $g^{x\_B}$) |

18. The computer implemented method according to claim 1, wherein the method of authenticating communication comprises the steps of communicating the following messages:

| | | |
|---|---|---|
| 1. | $A \rightarrow_N B$: | A, $INFO_A$, hash (A, $k_A$) |
| [B] $d_B$: = delay($k_B$,T) | | |
| 2. | $B \rightarrow_N A$: | B, $INFO_B$, hash (B, $k_B$), $d_B$ |
| 3. | $A \rightarrow_N B$: | $k_A$ |
| 4. | $B \rightarrow_N A$: | $k_B$ |
| [B] intime ($k_B$) | | |
| 5. | $A \leftrightarrow_E B$: | digest($k_A \oplus k_B$; INFOS) |

19. The computer implemented method according to claim 1, wherein both the first node and the second node are authenticated to each other, the method further comprising:
sending a second commitment message from the second node to the first node, the message containing content based on at least a second part of the combined information, which content commits the second node to the first value of the function, and wherein the second part of the combined information is communicated from the second node to the first node with a delay mechanism that only allows the second part of the information to be determined by the first node after a predetermined time; and
in response to receiving notification at the second node that the first node has received the message and that receipt of the commitment message from the first node, sending a second subsequent message comprising the first part of the information from the first node to the second node, or waiting until after the predetermined time; and
in response to the nodes receiving the first and second subsequent messages before the predetermined time, or in response to waiting until after the predetermined time:
compiling the combined information at the first node by combining the second part of the information, obtained from the second subsequent message or determined after the predetermined time using the delay mechanism, with the remainder of the combined information comprising the first part of the information received from the second node, wherein the first subsequent message is sent to subsequent to receipt of the second commitment message by the first node, and the remainder of the combined information used in compiling step at the second node comprises the second part of the information received from the first node.

20. A computer implemented method of authenticating communication between a plurality of nodes, using a function of combined information obtained from at least one of the nodes, the method comprising:
    sending a commitment message from each node of the plurality of nodes to each of the other nodes of the plurality of nodes, the commitment message containing content based on at least a part of the combined information, which content commits each of the nodes of the plurality of nodes to a first value of the function, and wherein each part of the combined information is communicated from each of the nodes of the plurality of nodes with a delay mechanism that only allows each part of the information to be determined by each of the other nodes of the plurality of nodes after a predetermined time; and
    in response to receiving notification at each of the nodes of the plurality of nodes that each of the other nodes of the plurality of nodes have received the message, which receipt commits each of the other nodes of the plurality of nodes to the first function value:
    sending a subsequent message comprising the respective part of the information from each node of the plurality of nodes to each of the other nodes of the plurality of nodes, or waiting until after the predetermined time;
    in response to each node of the plurality of nodes receiving the subsequent message from each node of the plurality of nodes before the predetermined time, or in in response to waiting until after the predetermined time:
    compiling the combined information at each node of the plurality of nodes by combining the parts of the information in the subsequent messages, or the parts of the information determined after the predetermined time, with any remainder of the combined information,
    calculating the function of the combined information at each node (or at least two) of the plurality of nodes, thereby to enable comparison of the calculated function values of each node (or at least two nodes) of the plurality of nodes over an empirical channel.

21. The computer implemented method of claim 20, wherein the method of authenticating communication comprises the steps of communicating the following messages:

| 1. | $\forall A \to_N \forall A'$: | A, $INFO_A$, hash (A, $k_A$) |
|---|---|---|
| $\forall A\ d_A := $ delay $(k_A, T)$ | | |
| 2. | $\forall A \to_N \forall A'$: | $d_A$ |
| 3. | $\forall A \to_N \forall A'$: | $k_A$ |
| $\forall A$ intime $(k_A)$ | | |
| 4. | $\forall A \leftrightarrow_E \forall A'$: | digest (k*, INFOS), |

22. A computing device adapted to perform a method of authenticating communication with a second device, using a function of combined information obtained from the second device, the computing device programmed to:
    in response to receiving a commitment message from the second device, the commitment message containing content based on at least a first part of the combined information, and receiving, either through a commitment message or a separate message, the first part of the combined information with a delay mechanism that only allows the computing device to determine the first part of the information after a predetermined time; and also
    receiving a subsequent message comprising the first part of the information from the other node to the node once the other node has received notification that the node has received the message, which receipt commits the node to the first function value;
    determining whether the subsequent message was received before the predetermined time, and
    in response to the subsequent message being received before the predetermined time, performing the steps of:
        compiling the combined information by combining the first part of the information in the subsequent message, with the remainder of the combined information at least part of which has been received from the second device,
        calculating the function of the combined information, thereby to enable comparison of the calculated function value with a value calculated by the second device, using an empirical channel, and
    in response to the subsequent message not being received before the predetermined time:
        aborting the authentication, determining the first part of the combined information in accordance with the delay mechanism, compiling the combined information using the determined first part of the information, and calculating the function value.

23. A computing device adapted to perform a method of authenticating communication with a second device, using a function of combined information obtained from the second device, the computing device programmed to:
    in response to receiving a commitment message from the second device, the commitment message containing content based on at least a first part of the combined information, and receiving, either through a commitment message or a separate message, the first part of the combined information with a delay mechanism that only allows the computing device to determine the first part of the information after a predetermined time;
    waiting until after the predetermined time;
    after the predetermined time has expired,
    performing the steps of:
        determining the first part of the combined information in accordance with the delay mechanism,
        compiling the combined information by combining the first part of the information, with the remainder of the combined information at least part of which has been received from the second device, and
        calculating the function of the combined information, thereby to enable comparison of the calculated function values of each node using an empirical channel, and if the subsequent message was received after the predetermined time:
    calculating the function of the combined information, thereby to enable comparison of the calculated function value with a value calculated by the second device, using an empirical channel.

24. The method of claim 23 wherein
    in response to the authentication being aborted:
        performing an audit of the communication between the nodes, wherein
    the audit comprises: the second node determining the value after the predetermined time in accordance with the delay mechanism thereby to enable comparison of the value at the first node and the second node using an empirical channel.

25. A computer implemented method of authenticating communication between a first node and a second node using a commitment scheme having a commit phase and a reveal phase, the method comprising:
committing the first node to a value during the commit phase;
revealing information that enables the value to be determined, during the reveal phase at the second node, thereby to enable comparison of the value at the first node and the data at the second node using an empirical channel,
characterised in that
data enabling the second node to determine the value, is sent to the second node with a delay mechanism that only allows the second node to determine the value after a predetermined time.

26. The method of claim 25 wherein the reveal phase comprises determining the value after the predetermined time in accordance with the delay mechanism and the information that enables the value to be determined comprises the data enabling the second node to determine the value.

27. The method of claim 25 wherein the reveal phase is commenced, before the predetermined time, and the authentication aborted if the information that enables the value to be determined is not revealed before the predetermined time.

28. A non-transitory computer readable medium comprising instructions that, when executed by a computer, cause the computer to carry out the method of:
sending a commitment message from the first node to the second node, the message containing content based on at least a first part of the combined information, which content commits the first node to a first value of the function, and wherein the first part of the combined information is communicated from the first node to the second node with a delay mechanism that only allows the first part of the information to be determined by the second node after a predetermined time; and
in response to receiving notification at the first node that the second node has received the message, which receipt commits the second node to the first function value:
sending a subsequent message comprising the first part of the information from the first node to the second node, or waiting until after the predetermined time; and
in response to the second node receiving the subsequent message before the predetermined time, or in response to waiting until after the predetermined time:
compiling the combined information at the second node by combining the first part of the information, obtained from the subsequent message or determined after the predetermined time using the delay mechanism, with the remainder of the combined information at least part of which has been received from the first node,
calculating the function of the combined information at each of the first node and the second node, thereby to enable comparison of the calculated function values of each node using an empirical channel.

* * * * *